United States Patent [19]

Yamada et al.

[11] Patent Number: 5,012,278

[45] Date of Patent: Apr. 30, 1991

[54] DOCUMENT DENSITY DETECTOR APPARATUS

[75] Inventors: Shuji Yamada, Hyogo; Hironori Ando, Osaka, both of Japan

[73] Assignee: Mita Industrial Co., Ltd., Osaka, Japan

[21] Appl. No.: 369,946

[22] Filed: Jun. 22, 1989

[30] Foreign Application Priority Data

Jun. 25, 1988 [JP] Japan ........................ 63-157710
Aug. 31, 1988 [JP] Japan ........................ 63-217855

[51] Int. Cl.[5] ........................ G03B 27/52

[52] U.S. Cl. ........................ 355/55; 355/68; 355/235

[58] Field of Search ........................ 355/55-57, 355/68, 69, 235

[56] References Cited

U.S. PATENT DOCUMENTS 4,200,341 4/1980 Sakamoto et al. ........ 355/68 X
4,544,258 10/1985 Takano ........ 355/68 X
4,624,547 11/1986 Endo et al. ........ 355/69

FOREIGN PATENT DOCUMENTS 60-117264 6/1985 Japan .
61-63864 4/1986 Japan .

*Primary Examiner*—L. T. Hix
*Assistant Examiner*—D. Rutledge
*Attorney, Agent, or Firm*—Beveridge, DeGrandi & Weilacher

[57] ABSTRACT

A document density detector apparatus to be used for an image forming apparatus in which a focal lens is disposed in an optical pass for guiding light reflected from the surface of a document, to the surface of a light receiving body, and a light sensor for detecting the density of the document is fixed outside of an area through which the light reflected from the surface of the document passes before illuminating a predetermined surface of the light receiving body, and in which an image of the document formed on the light receiving body may be enlarged or reduced at the desired magnification by moving the focal lens along the optical pass in the direction toward the document or toward the light receiving body. When an image forming mode is set at magnification which causes the focal lens to be moved to a position nearer to the document from the reference position, the focal lens is moved such that the density of a document is detected with the focal lens moved to the reference position, and when a mode for automatic detection of the density of a document is set before image forming, for an image forming apparatus capable of selecting the mode for automatic detection, or at any time for an image forming apparatus so arranged as to always execute automatic detection of the density of a document, before image forming.

14 Claims, 20 Drawing Sheets

DOCUMENT DENSITY DETECTOR APPARATUS

BACKGROUND OF THE INVENTION

The present invention relates to a document density detector apparatus used in an image forming apparatus, such as an analogue or digital electrophotographic copying apparatus or a facsimile, which has a document reading mechanism and is adapted to process the read document information, thereby to form an image. More particularly, the present invention relates to a document density detector apparatus used in a image forming apparatus having enlarging and/or reducing functions for changing the document image at the desired magnification. More specifically, the present invention relates to a document density detector apparatus used in an image forming apparatus which includes (i) an optical pass for guiding light from the document to a light receiving body and (ii) a focal lens movable in the optical pass toward the document or toward the light receiving body and in which, by moving the focal lens in the optical pass, the document image formed on the light receiving body may be enlarged or reduced at the desired magnification.

The following description will discuss an analogue electrophotographic copying apparatus as an example of the image forming apparatus above-mentioned.

There is known an analogue electrophotographic copying apparatus in which the document is pre-illuminated and scanned, and the light reflected from the document is detected in intensity by a photosensor, according to the output of which the density of the document is automatically adjusted (For example, Japanese Unexamined Patent Publication No. 60-117264/1985 or Japanese Unexamined Patent Publication No. 61-63864/1986).

FIG. 18 and FIG. 19 are schematic perspective and plan views, respectively, illustrating a propagation area of the light which illuminates the document and is reflected therefrom and to which the photoreceptor is exposed (hereinafter referred to as light propagation area). Light projected from a light source (not shown) is reflected from a document 2, and the light thus reflected is collected by a focal lens 5. The light thus collected then illuminats a photoreceptor 3. A light sensor 1 such as a photosensor or the like is disposed outside of the light propagation area 4 of the light given from the document 2 to the photoreceptor 3 such that the light sensor 1 does not intercept the light to be given to the photoreceptor 3. The light sensor 1 is attached to a lens unit (not shown), and adapted to detect the light reflected from the document 2 substantially at the center thereof.

For the electrophotographic copying apparatus having enlarging and/or reducing functions, the focal lens 5 is movable in the optical pass toward the document 2 or toward the photoreceptor 3. For equal-magnification copy, the focal lens 5 is located in a position shown by solid lines in FIG. 19. For enlargement copy, the focal lens 5 is moved to a position 5*a* upstream of the position above-mentioned, as shown by a two dot chain line, while for reduction copy, the focal lens 5 is moved to a position 5*b* downstream of the position above-mentioned.

As mentioned earlier, the light sensor 1 is attached to the lens unit, and the position thereof is fixed regardless of the movement of the focal lens 5.

When the light sensor 1 and the focal lens 5 are arranged as above-mentioned and the focal lens 5 is movable in the optical pass, the following problems may be encountered:

(A) There is the liklihood that the focal lens 5 moved to the upstream position 5*a* for enlargment copy intercepts a portion of an optical pass 6 of the light incident upon the light sensor 1 (In FIG. 19, the light is intercepted in the hatched area).

If the density of a document is detected under such a condition, the document density thus detected is erroneously judged as higher than the actual one, since the amount of light detected by the light sensor 1 is decreased in an amount of the intercepted incident light.

(B) To solve the problem (A) above-mentioned, the light sensor 1 may be kept away from the focal lens 5. This not only makes it difficult to adjust the amount of light received by the light sensor 1, but also requires to increase in size the lens unit (not shown) to which the light sensor 1 is attached. Further, if the light sensor 1 is moved upstream, this newly presents the problem that the light sensor 1 prevents a light reflector (not shown) forming the optical pass, from moving.

(C) To solve the problem (A) above-mentioned, it may be also proposed to arrange the light sensor 1 to be movable together with the focal lens 5. However, since the light sensor 1 is connected to an electric wire, such a proposal involves another problem in view of the safety standards of the apparatus.

It is an object of the present invention to provide a document density detector apparatus used in an image forming apparatus, capable of accurately detecting the density of a document without interception of the light given to the light sensor 1 by the focal lens 5 at the time of detection of the document density.

It is another object of the present invention to provide a document density detector apparatus used in an image forming apparatus, capable of accurately detecting the density of a document even though the focal lens 5 intercepts a portion of the light incident on the light sensor 1 at the time of detection of the document density.

SUMMARY OF THE INVENTION

In the document density detector apparatus in accordance with a first feature of the present invention, there is set a reference position of a focal lens where a light sensor can receive light reflected from a document with the focal lens not intercepting this reflected light. The document density detector apparatus of the first invention includes means for moving the focal lens such that the density of a document is detected with the focal lens moved to the reference position above-mentioned, when image forming is to be carried out at magnification which causes the focal lens to be moved from the reference position to a position nearer to the document, and in a mode where automatic detection of the document density is executed before image forming.

According to the document density detector apparatus above-mentioned, the focal lens is moved to the reference position if the above two conditions are met before the light sensor receives the light from the document for detection of the density thereof. Accordingly, even though the focal lens is moved to a position nearer to the document for changing the document reading magnification, the focal lens is always returned to the reference position at the time of detection of the document density. As long as the focal lens is located in the reference position, there is no possibility of the focal lens intercepting the light transmitted from the document to the light sensor.

According to the document density detector apparatus of a second feature of the present invention, the relationship between a stop position of the focal lens and a correction value for the light sensor output is previously stored, and according to the stop position of the focal lens, the corresponding stored output correction value is read out to correct the output of the light sensor.

According to the document density detector apparatus of the second invention, if the light to be received by the light sensor is partially intercepted by the focal lens, correction means reads out the corresponding output correction value from memory means, thereby to correct the output of the light sensor. Accordingly, even though the light to be received by the light sensor is partially intercepted by the focal lens, the output of the light sensor may be corrected. This achieves accurate detection of the document density.

The document density detector apparatus of the second invention may be arranged such that the light amount of the light source may be corrected instead of or together with the correction of the output of the light sensor.

EMBODIMENTS

[I] Outline of Electrophotographic Copying Apparatus

The document density detector apparatus in accordance with the present invention will be discussed with an electrophotographic copying apparatus taken as an example. It is however noted that the present invention may be widely applied to apparatus including a document reading mechanism which has (i) an optical pass for guiding light from the document to a light receiving body (including not only the photoreceptor drum above-mentioned but also a light receiving element such as a CCD) and (ii) a focal lens movable along the optical pass toward the document or toward the light receiving body, and which is adapted to form an image of the document at the desired magnification on the light receiving body, by adjusting the position of the focal lens. Examples of such apparatus include the electrophotographic copying apparatus above-mentioned, a digial electrophotographic copying apparatus, a facsimile, etc.

Figure 2:
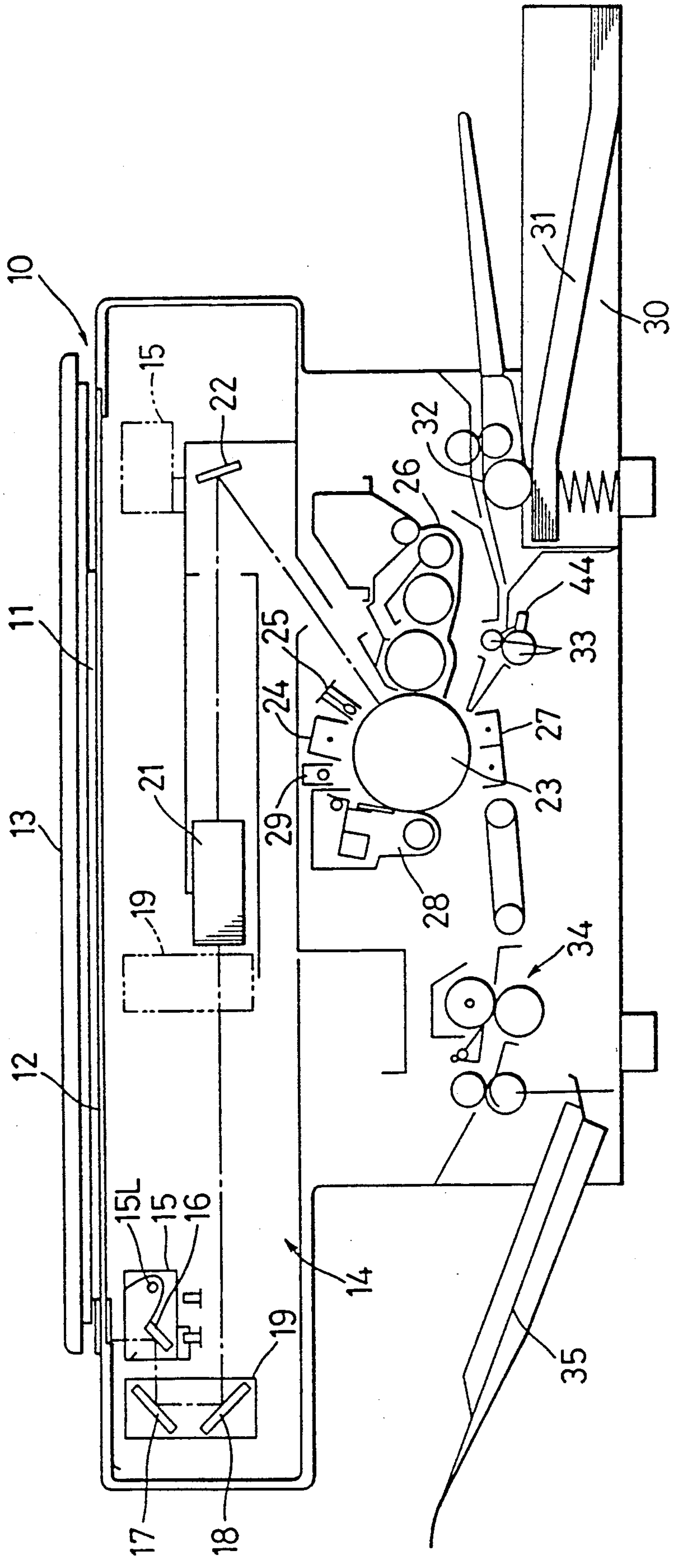
FIG. 2 is a schematic view of the inner structure of an electrophotographic copying apparatus 10.

FIG. 2 is a section view of the schematic arrangement of the copying apparatus 10.

The copying apparatus 10 is provided on the top thereof with a transparent platen 12 on which a document 11 is to be placed. An openable document cover 13 is disposed on the transparent platen 12. The copying apparatus 10 is provided at the upper portion inside thereof with a light exposure apparatus 14 for reading the document. The light exposure apparatus 14 incorporates a document density detector apparatus.

The light exposure apparatus 14 includes a lamp unit 15 having a lamp 15L for illuminating the document 11 placed on the transparent platen 12. The lamp unit 15 is movable from the left-end stop position shown by solid lines to the right-end scanning completion position shown by two dot chain lines. The document 11 is illuminated and scanned by moving the lamp unit 15.

The lamp unit 15 has a first mirror 16 for guiding light reflected from the document 11 to a predetermined direction. The light reflected by the first mirror 16 is further reflected by second and third mirrors 17, 18. The second and third mirrors 17, 18 are attached to a common mirror frame 19. In association with the movement of the lamp unit 15, the mirror frame 19 follows the lamp unit 15 at a speed equal to about a half of the moving speed of the lamp unit 15. Such an arrangement is employed in order to maintain the optical pass length from the document 11 to a focal lens 21. Accordingly, when the lamp unit 15 is located in the right-end scanning completion position shown by the two dot chain lines in FIG. 2, the mirror frame 19 is moved to the substantially center portion of the apparatus 10.

The light reflected by the third mirror 18 is given to a fourth mirror 22 through the focal lens 21 interposed in the optical pass. A photoreceptor drum 23 is irradiated by the light further reflected by the fourth mirror 22.

The copying apparatus 10 has enlarging and reducing functions. In this connection, the focal lens 21 is moved in the optical pass toward the document for enlargement copy, or toward the photoreceptor for reduction copy.

A light sensor 41 (See FIG. 3) used for detecting the density of a document is disposed in the vicinity of the focal lens 21 outside of the light propagation area 20 (See FIG. 3), to be discussed later.

Disposed around the photoreceptor drum 23 along the rotation direction thereof are such devices required for image forming as a corona discharger 24 for electrifying the drum surface to a predetermined potential, an erase lamp 25 for removing an unnecessary electrified charge, a developing device 26 for developing an electrostatic latent image formed by light exposure into a toner image, a transferring and separating corona discharger 27, a cleaner 28 for removing toner, remaining on the drum surface, and an electric charge removing lamp 29 for removing the residual electric charge.

To feed copying paper according to the operation of each of the image forming devices above-mentioned disposed around the photoreceptor drum 23, there are disposed a paper feed cassette 30, paper feed rollers 32 for taking, one by one, paper sheets 31 from the paper feed cassette 30, and a pair of resist rollers 33 for feeding copying paper at a predetermined timing to the photoreceptor drum 23 (A so-called secondary paper feeding is carried out). Further, a resist switch 44 for detecting the presence or absence of the paper at the resist rollers 33 is disposed immediately before the resist rollers 33.

The toner image formed on the surface of the photoreceptor drum 23 is transferred to the paper guided by the secondary paper feeding under the action of the transferring and separating corona discharger 27. The paper onto which the toner image has been transferred, is separated from the surface of the photoreceptor drum 23 and sent to a fixing device 34. The paper on which toner image has been fixed by the fixing device 34, is discharged to a paper discharge tray 35.

Figure 3:
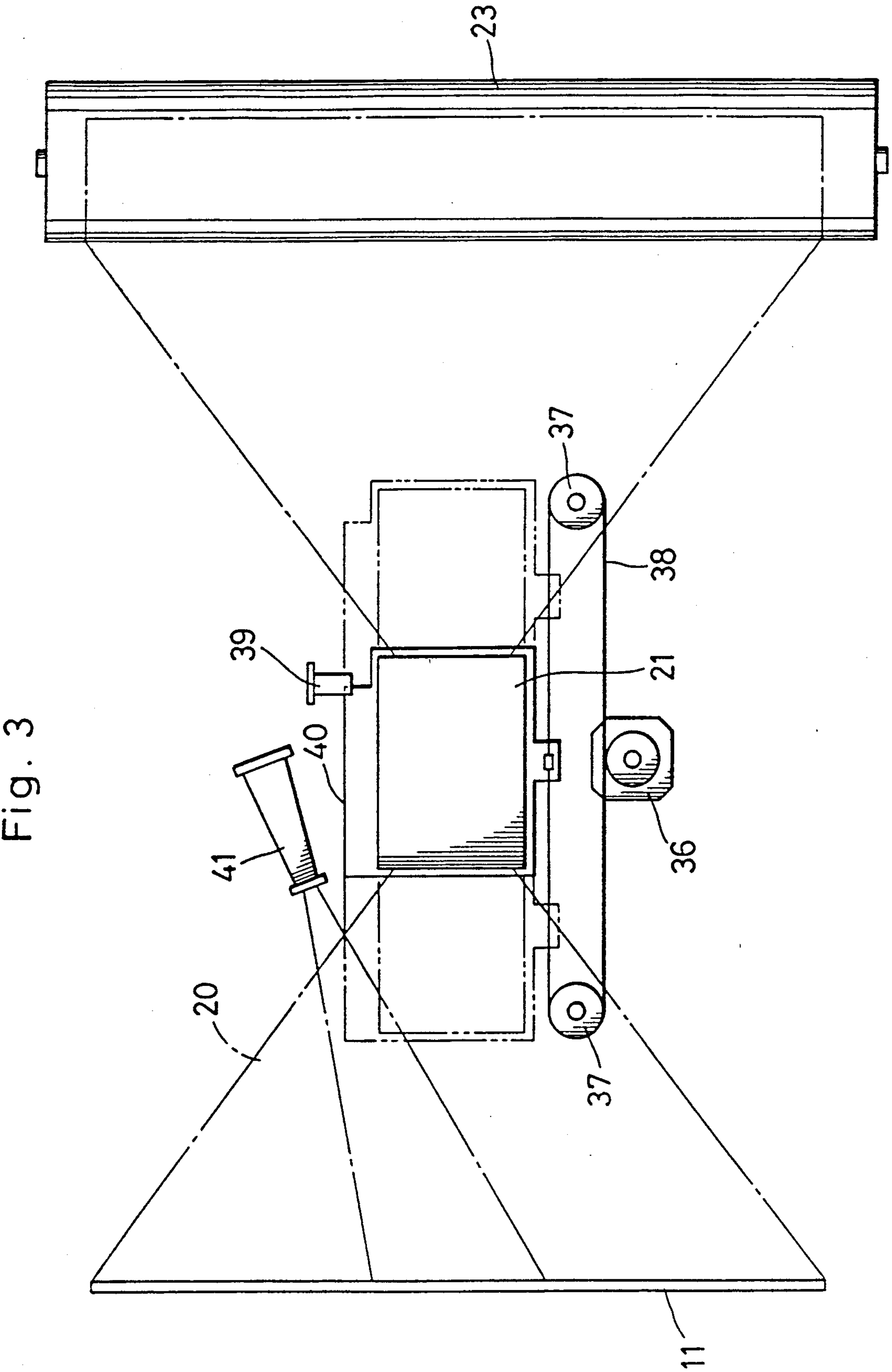
FIG. 3 is a developed plan view of an optical pass in the electrophotographic copying apparatus 10.

FIG. 3 is a plan view illustrating the optical pass, as developed, of the light exposure apparatus 14 in the copying apparatus 10.

As shown in FIG. 3, the focal lens 21 is disposed in the light propagation area 20, and the light reflected by the document 11 is collected by the focal lens 21. The light thus collected is sent to the photoreceptor drum 23 on which an image is formed.

For enlargement copy, the focal lens 21 is moved in the optical pass toward the document 11 and stopped at a predetermined position, as shown by two dot chain lines in FIG. 3. For reduction copy, the focal lens 21 is moved toward the photoreceptor drum 23 and stopped at a predetermined position. In this connection, the focal lens 21 is connected to a wire 38 wound on two pulleys 37. The wire 38 is adapted to be moved by a lens motor 36. In this copying apparatus, the lens motor 36 is a step motor.

A lens position detector switch 39 is disposed for detecting that the focal lens 21 movable in the manner above-mentioned, is located in a predetermined reference position, i.e., the equal-magnification position, shown by the solid lines. The lens position detector switch 39 is formed by a photoelectric switch including, for example, a light projecting element and a light receiving element. The lens position detector switch 39 is adapted to detect whether or not the focal lens 21 is located in the reference position, based on the fact that a shield plate 40 attached to the focal lens 21 shields or does not shield the light from the light projecting element to the light receiving element. Further, the focal lens 21 is moved by the step motor 36 by the desired amount toward the document or toward the photoreceptor 23 based on the fact that the step motor 36 has been rotated a certain number of steps from the reference position detected by the lens position detector switch 39.

Likewise in a conventional apparatus, the light sensor 41 for detecting the document density, is disposed outside of the light propagation area 20 such that the light sensor 41 does not intercept the propagation of the light to which the photoreceptor drum 23 is exposed. The light sensor 41 includes a photosensor such as photodiodes for converting the incident light into an electric signal. The light sensor 41 is formed into a cylindrical body for regulating the light incident angle such that only the light reflected from the document at the substantially center portion thereof is detected.

The copying apparatus 10 above-mentioned is of the so-called center-basis type in which the positional alignment of the document placed on the transparent platen 12 is made at the center of the document. In this connection, the light sensor 41 is adapted to detect the light reflected from the document 11 at the substantially center portion thereof. Alternately, when the copying apparatus is of the so-called one-side basis type in which the positional alignment of the document is made at one side thereof, the light sensor 41 may be so adapted as to detect the light reflected from the document 11 at a predetermined area of the reference-end side therof.

Figure 4:
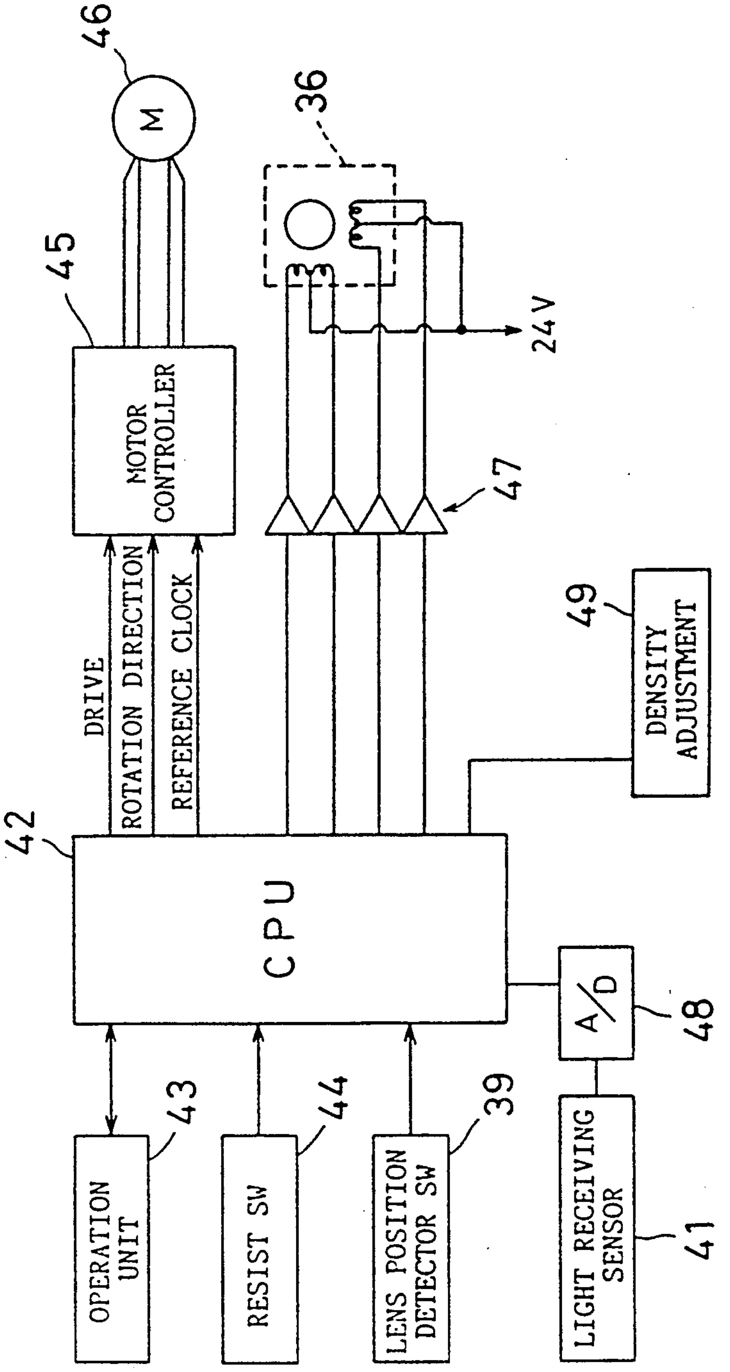
FIG. 4 is a block diagram of a control circuit of the electrophotographic copying apparatus 10.

[II] Document density detector apparatus in accordance with a first embodiment of the present invention FIG. 4 is a block diagram showing the arrangement of an electric control circuit in the document density detector apparatus.

The control circuit is arranged with a CPU 42 located in the center thereof. The control circuit is adapted such that signals from an operation unit 43, a resist switch 44 and the lens position detector switch 39 are supplied to the CPU 42. A signal from the light sensor 41 is supplied, as converted into a digital signal by an analogue/digital converter 48, to the CPU 42. The operation unit 43 is disposed at, for example, the operator side on the top surface of the copying apparatus 10, and includes a print switch, an automatic light exposure switch for designating the execution or non-execution of automatic detection of the document density, an enlargement copy designation switch, a reduction copy designation switch, a magnification designation key and the like, all the switches and key being not shown.

The CPU 42 is adapted to start the control operations based on signals from the operation unit 43. A drive control signal, a rotation-direction control signal, a reference clock and the like supplied from the CPU 42 are supplied to a motor controller 45, which, in turn, controls the rotation timing, the rotation time, the rotation direction and the like of an optical motor 46. The optical motor 46 is disposed for driving the lamp unit 15, the mirror frame 19 and the like incorporated in the light exposure apparatus 14.

The CPU 42 is also adapted to drive the lens motor 36 through a driver 47. Further, the CPU 42 is adapted to adjust a density adjusting unit 49 and to detect the size of the document, based on the output from the light sensor 41.

Figure 5:
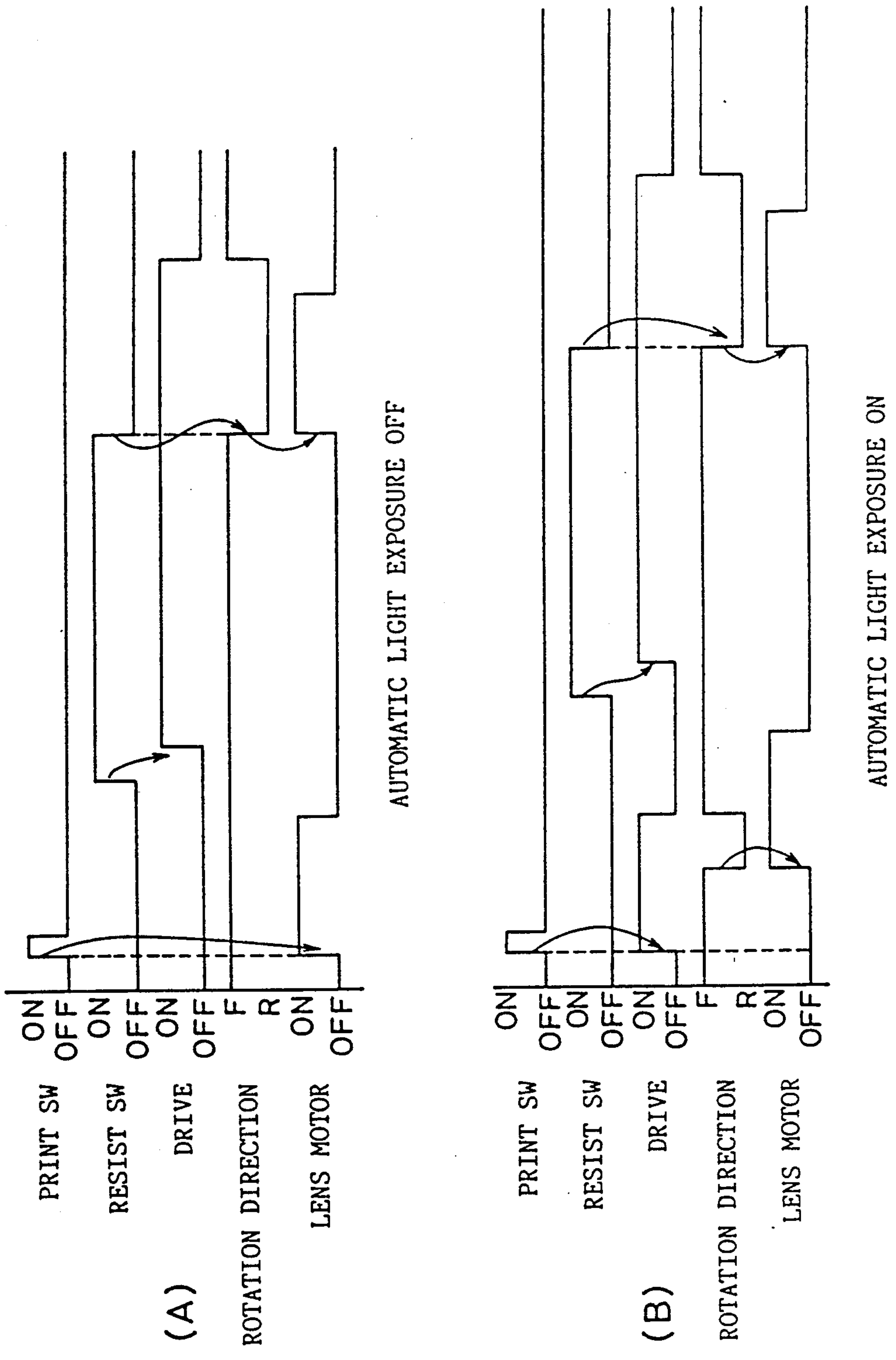
FIG. 5 is a timing chart of operations of the control circuit in FIG. 4.

FIG. 5 is timing charts showing the operations of the control circuit in FIG. 4. FIG. 5 (A) shows a timing chart of the control operations of the document density detector apparatus made at the time when the automatic detection of the document density is not carried out (with the automatic light exposure switch turned OFF). FIG. 5 (B) shows a timing chart of the control operations of the document density detector apparatus made at the time when the automatic detection of the document density is carried out (with the automatic light exposure switch turned ON).

Figure 1:
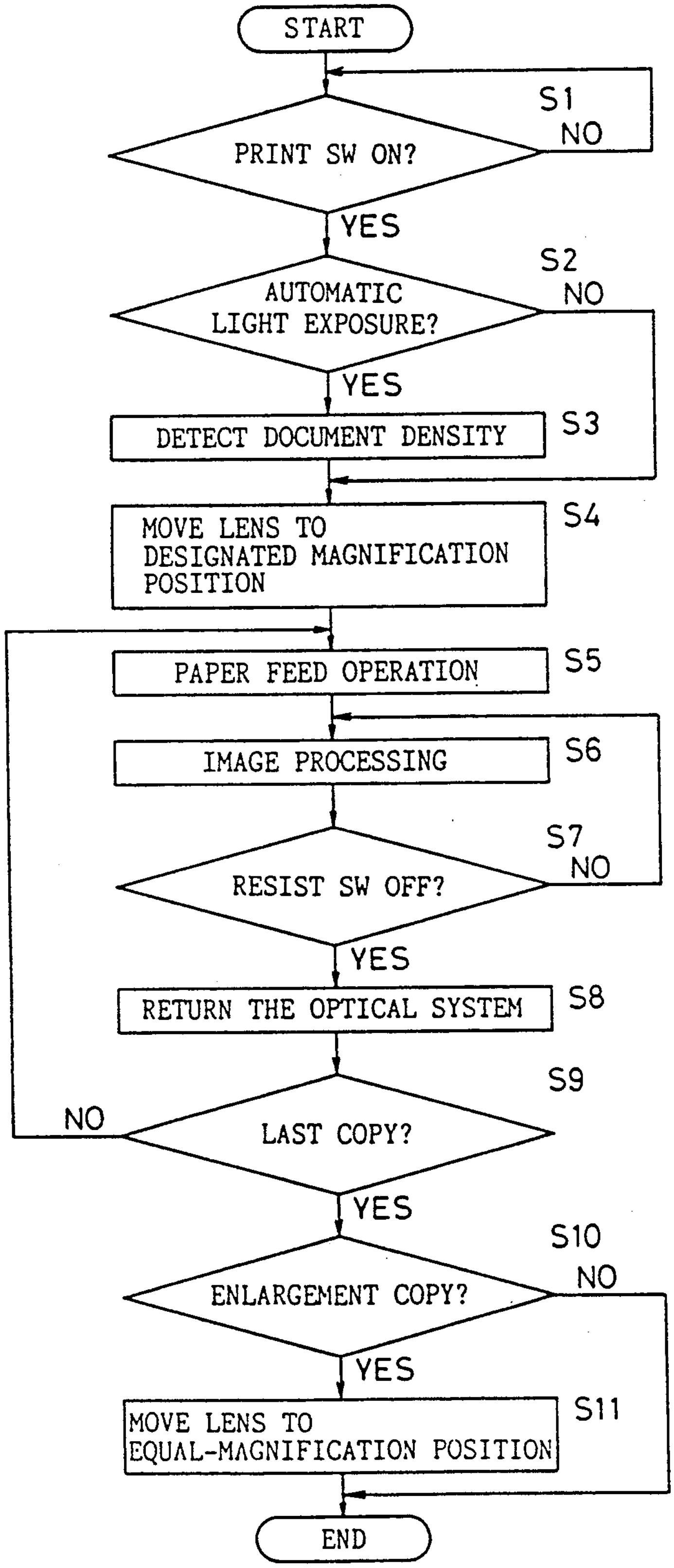
FIG. 1 is a flowchart of control operations of a document density detector apparatus in accordance with a first embodiment of the present invention.

FIG. 1 is a flowchart of the operations of the control circuit above-mentioned.

The following description will discuss the operations of the document density detector apparatus in accordance with the first embodiment of the present invention is applied, along the flow in FIG. 1 with reference to FIG. 2 or FIG. 5.

When the CPU 42 judges that the print switch of the operation unit 43 has been turned ON (step S1), the CPU 42 then judges the ON/OFF state of the automatic light exposure switch (step S2). When the automatic light exposure switch is ON, the light exposure apparatus 14 is operated such that the document 11 is pre-illuminated and scanned. Based on the amount of the light thus detected by the light sensor 41, the document density is detected (step S3). When detecting the document density, the focal lens 21 is always located in the equal-magnification position. This assures no interception of the light incident on the light sensor 41 by the focal lens 21.

Based on the document density thus detected, the CPU 42 adjusts the density adjusting unit 49. More specifically, there are automatically adjusted the voltage of the corona discharger 24, the developing bias voltage of the developing device 26, or the lamp voltage of the lamp unit 15 and the like (See FIG. 2) to optimize the copy density.

When the automatic light exposure switch is ON, the lamp unit 15 starts returning after the document density detection above-mentioned has been made. Thereafter, the CPU 42 drives the lens motor 36 to provide the copying magnification designated at the operation unit 43. This causes the focal lens 21 (See FIG. 3) to be moved to the position corresponding to the designated copying magnification (step S4). If the automatic light exposure switch is OFF in step S2, the CPU 42 immediately goes to step S4 without detecting document density.

Then, paper feed by the paper feed rollers 32 (See FIG. 2) starts (step S5) and, based on the fact that the resist switch 44 is turned ON, the optical motor 46 is forwardly rotated to execute an image processing including illumination and scanning of the document 11 (step S6; See FIG. 5). The rear end of the paper thus fed (in other words, the rear end of the document 11) is detected by the fact that the resist switch 44 is switched to OFF (step S7). The optical motor 46 is then reversely rotated to return the lamp unit 15 (See FIG. 2) to the illumination and scanning start position (step S8).

The control operations of steps S5 to S8 are repeated until the document 11 is copied by the preset number of copies. When it is judged that the document 11 has been copied by the preset number of copies, i.e., when the light exposure operation is complete for the last copy or when the last copy paper is discharged to the paper discharge tray 35 (step S9), it is then judged whether or not the copy mode has been the enlargement copy mode (step S10). When the mode has been the enlargement copy mode, the focal lens 21 is returned to the equal-magnification position as the reference position by the lens motor 36 (step S11). However, it is preferable that the display of enlargement copy on the operation unit 43 remains as it is.

Thus, this embodiment is characterized in that, when automatically detecting the document density in the enlargement copy mode, the document density detecting operation is carried out before the focal lens 21 is moved to the designated magnification position, and the focal lens 21 is always returned to the equal-magnification position after the enlargement copy has been made.

Figure 6:
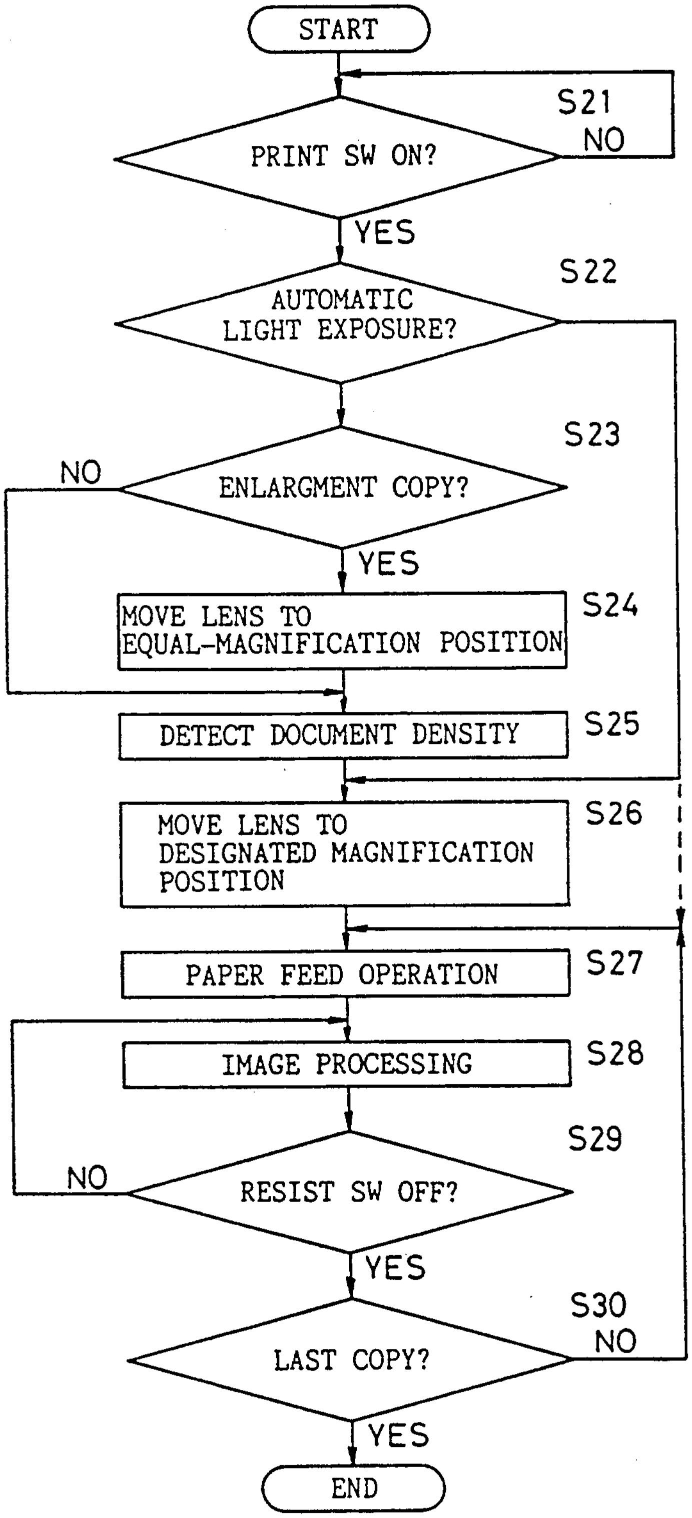
FIG. 6 is a flowchart of another operations of the control circuit in FIG. 4.

FIG. 6 is a flowchart of another control operations of the control circuit in FIG. 4. By this control circuit, the control operations shown in FIG. 6 may be made instead of the control operations shown in FIG. 1. The following description will discuss the control operations along the flow in FIG. 6.

When the CPU 42 judges that the print switch is turned ON (step S21), the CPU 42 then judges the ON/OFF state of the automatic light exposure switch (step S22). When the automatic light exposure switch is ON, it is judged whether or not the focal lens 21 is located in the enlargement-copy position (step S23). When the focal lens 21 is in the enlargement-copy position, the focal lens 21 is moved first to the equal-magnification position by the lens motor 36 (step S24). When the mode is not the enlargement copy mode, the document density detecting operation is made with the focal lens 21 remaining at the position where it was (steps S23 and S25).

It is the characteristic of the control operations that, when detecting the document density in the enlargement copy mode, the focal lens 21 is moved to the equal-magnification position as the reference position.

After the document density detecting operation has been finished, the focal lens 21 is moved to the position corresponding to the designated copying magnification (step S26). Likewise in the flowchart in FIG. 1, the paper feed operation and the image processing are repeated until the last copying is complete (steps S27 to S30).

In the foregoing, the description has been made of the control operations of the type in which, after the print switch has been turned ON, the focal lens 21 is moved to the position corresponding to the designated copying magnification immediately before the copying operation is made. However, there is also available the control operations of the type in which the focal lens is moved to the position corresponding to the designated copying magnification before the print switch is turned ON. In the control operations of this type, when the automatic light exposure switch is OFF (step S22), the sequence may immediately proceed to the step S27 of paper feed (See the operation shown by a dotted line in FIG. 6).

Figure 7:
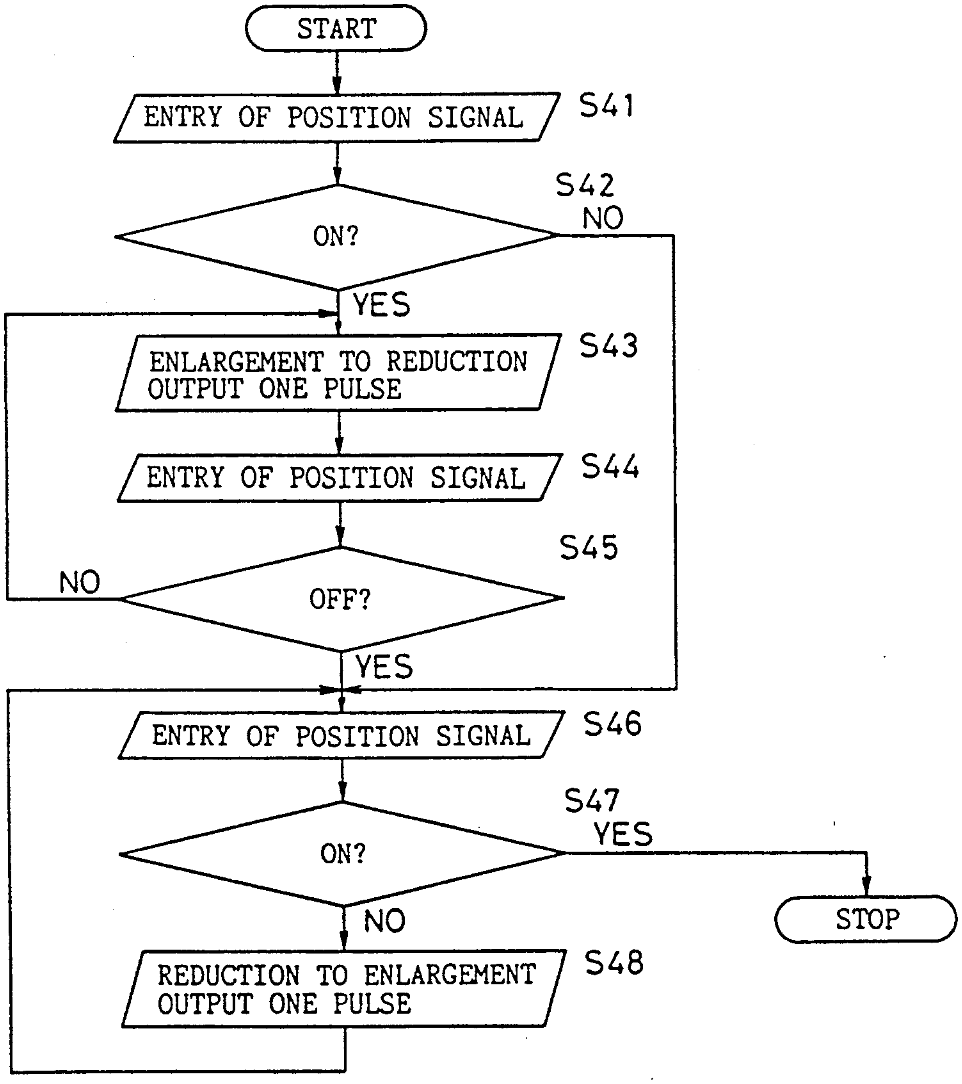
FIG. 7 is a flowchart of the control operation for moving a focal lens 21 to a reference position.

FIG. 7 is a flowchart of the control by the lens motor 36 made at the time when the control circuit in FIG. 4 moves the focal lens 21 to the reference position, i.e., the equal-magnification position.

As shown in FIG. 3, the focal lens 21 has the shield plate 40, with which the lens position detector switch 39 is switched in state from ON to OFF and vice versa. More specifically, when the focal lens 21 is positioned a little to the reduction copy side with respect to the equal-magnification position, the lens position detector switch 39 is always turned OFF by the shield plate 40. When the focal lens 21 is positioned a little to the enlargement copy side with respect to the equal-magnification position, the lens position detector switch 39 is not obstructed by the shield plate 40, so that the switch 39 is always ON. The moment the focal lens 21 reaches the equal-magnification position in its passage from the reduction copy side to the enlargement copy side, the lens position detector switch 39 is switched from OFF to ON.

On the assumption of the foregoing, the following description will discuss the control operations along the flow shown in FIG. 7.

The CPU 42 reads the ON/OFF state of the lens position detector switch 39 (step S41). When the switch 39 is ON (step S42), it is judged that the focal lens 21 is positioned at the enlargement copy side, and the operations of the steps S43, S44 and S45 are carried out. On the other hand, when the lens position detector switch 39 is not ON, it is judged that the focal lens 21 is positioned at the reduction copy side and the operations of S46 to S48 are carried out.

When the lens position detector switch 39 is ON, the CPU 42 gives one pulse to the lens motor 36 which is a step motor. This causes the lens motor 36 to be rotated by an amount corresponding to one pulse such that the focal lens 21 is moved from the enlargement copy side toward the reduction copy side (step S43). After the lens motor 36 has been rotated by an amount corresponding to one pulse, the CPU 42 reads the state of the lens position detector switch 39 (step S44). Such control operations are repeated until the switch 39 is turned OFF (steps S43, S44, S45). Thus, the focal lens 21 positioned at the enlargement copy side, is moved to the reduction copy side after having passed through the equal-magnification position.

When the lens position detector switch 39 is OFF (steps S42, S45 or S47), the CPU 42 causes the lens motor 39 to be rotated by an amount corresponding to one pulse such that the focl lens 21 is moved from the reduction copy side to the enlargement copy side (step S48), and repeats the control operation for judging the state of the lens position detector switch 39. The moment the lens position detector switch 39 is turned ON, the control operation is halted.

As the result, the focal lens 21 is always moved from the reduction copy side toward the enlargement copy side, and stops at the equal-magnification position when the focal lens 21 reaches this position. This enables the reference stop position of the focal lens 21 to be accurate.

In particular, when provision is made such that the focal lens 21 is moved from one direction and stops at the reference position, there is no likelihood that the reference position is shifted due to backlash of the step motor 36 or the like. Further, according to the control operations shown in FIG. 7, when the enlargement copy mode is selected, the focal lens 21 is always moved to the equal-magnification position as the reference position when the copying operation is complete (See FIG. 1) or immediately before the document density detecting operation is made (See FIG. 6). Accordingly, the reference position of the focal lens 21 may be automatically corrected each time. This advantageously enables the focal lens 21 to be accurately positioned at all times.

According to the control operations above-mentioned, the equal-magnification position is used as the reference position of the focal lens 21 and, when the focal lens 21 is moved toward the enlargement copy side with respect to the equal-magnification position, the focal lens 21 is moved to the equal-magnification position at the time of the document density detecting operation. However, the present invention includes the following modifications.

When the focal lens 21 is moved in the direction toward the document from a reference position, the focal lens 21 might intercept the light incident on the light sensor 41 due to the positional relationship between the focal lens 21 and the light sensor 41, as shown in FIG. 3. In this connection, the document density detecting operation may be made after the focal lens has been moved to at least the reference position in the direction toward the photoreceptor. Accordingly, if there is the likelihood that, when the focal lens 21 is relatively moved in the direction toward the document, the focal lens 21 intercepts the light incident on the light sensor 41, due to the positional relationship between the focal lens 21 and the light sensor 41, not only in the enlargement copy mode but also in the reduction copy mode, the focal lens 21 may be moved to the predetermined reference position where such likelihood is not involved. That is, the reference position is not always the equal-magnification position, but may be a reduction copy position or an enlargement copy position.

According to this embodiment, there may be provided an apparatus capable of automatically detecting the density of a document accurately at all times. In particular, when the apparatus of the present invention is applied to a copying apparatus capable of reading the document as enlarged at the desired magnification, the density of a document may be accurately detected regardless of the magnification used at the time of reading the document.

[III] Second Embodiment

Figure 8:
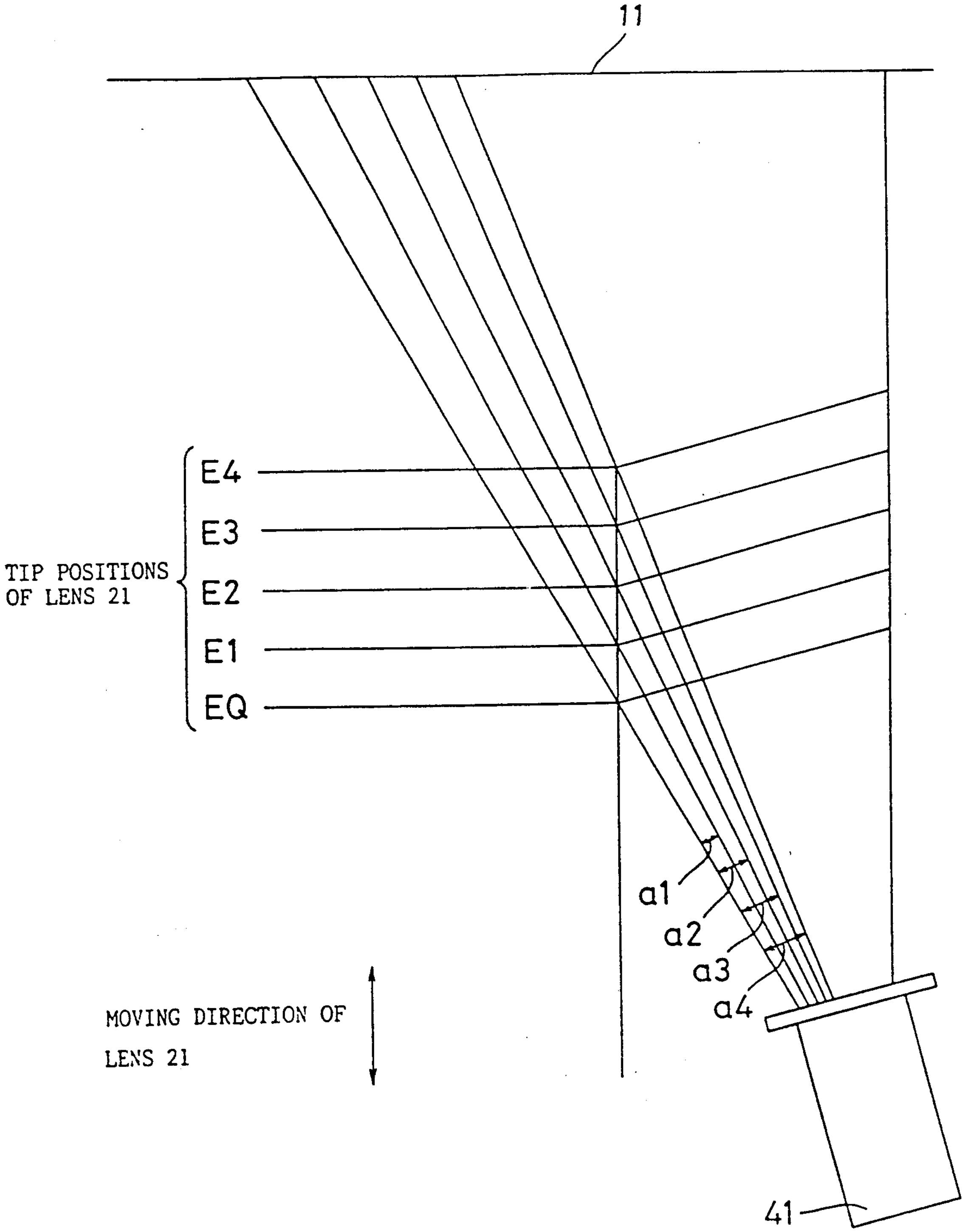
FIG. 8 is a view illustrating, in a document density detector apparatus in accordance with a second embodiment of the present invention, the relationship between the tip position of the focal lens and the interception ratio of the light incident on the light sensor.

FIG. 8 is a schematic diagram showing the relationship between the tip positions El to EQ of the focal lens 21 and the interception ratios of the light incident on the light sensor 41. When the focal lens 21 is moved in the optical pass toward the document and the tip of the focal lens 21 passes through the position EQ and reaches the position El, a light portion al is intercepted out of the light incident on the light sensor 41. If the tip of the focal lens 21 reaches the position E2, a light portion a2 is intercepted out of the light incident on the light sensor 41. Likewise, a light portion a3 and a light portion a4 are respectively intercepted at the positions E3 and E4.

The relationship between the tip position of the focal lens 21 and the interception ratio of the light incident on the light sensor 41, is inherent in the apparatus. According to the second embodiment of the present invention, provision is made such that this relationship is previously measured and stored, and the output of the light sensor 41 is corrected, by a signal processing, according to the stop position of the focal lens 21. This is the characteristic of the second embodiment.

Figure 9:
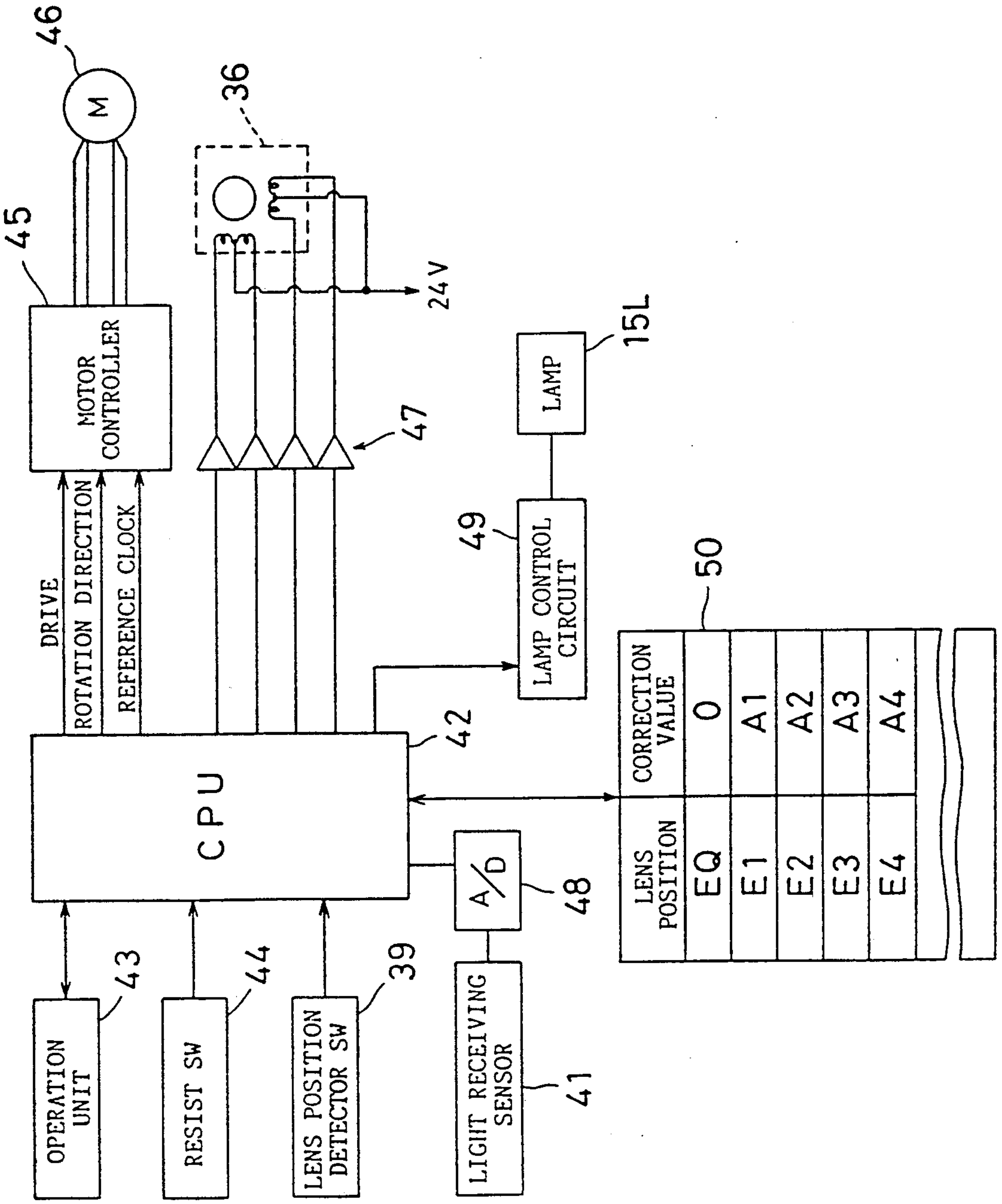
FIG. 9 is a block diagram of a control circuit used in the second embodiment of the present invention.

FIG. 9 is a block diagram illustrating the arrangement of the electric control circuit of the document density detector apparatus in accordance with the second embodiment of the present invention.

The control circuit is arranged with a CPU 42 located in the center thereof. The control circuit is adapted such that signals from an operation unit 43, the resist switch 44 and the lens position detector switch 39 are supplied to the CPU 42. A signal from the light sensor 41 is also supplied, as converted into a digital signal by an analogue/digital converter 48, to the CPU 42. The operation unit 43 is disposed at, for example, the operator side on the top surface of a copying apparatus 10, and includes a print switch, an automatic light exposure switch for designating the execution or non-execution of automatic detection of the document density, an enlargement copy designation switch, a reduction copy designation switch, a magnification designation key and the like, all the switches and key being not shown.

The CPU 42 is connected to a memory 50 which contains previously measured correction values of an output of the light sensor 41. More specifically, there are calculated and stored the output correction values of 0, A1, A2, A3 and A4 to be selectively added to the output of the light sensor 41, respectively, at the focal lens 21 tip stop positions EQ, El, E2, E3 and E4, based on the relationship between the focal lens tip position and the light interception ratio, discussed in connection with FIG. 8.

According to this second embodiment, the stop position of the focal lens 21 is divided in four stages, and the output correction values for the respective stages are stored in the memory 50. However, the tip position of the focal lens 21 may be divided in further fine stages, and the output correction values for the respective stages may be stored in the memory 50.

A drive control signal, a rotation-direction control signal, a reference clock supplied from the CPU 42 are supplied to a motor controller 45, which, in turn, controls the rotation timing, the rotation time, the rotation direction and the like of an optical motor 46. The optical motor 46 is disposed for driving a lamp unit 15, a mirror frame 19 and the like forming a light exposure apparatus 14.

The CPU 42 is also adapted to drive the lens motor 36 through a driver 47. By the lens motor 36, the focal lens 21 may be moved to a predetermined position. Further, the CPU 42 is adapted to control a lamp control circuit 49 to increase or decrease the voltage applied to a light exposure lamp 15L. Thus, the luminous intensity of the lamp 15L may be adjusted.

Figure 10:
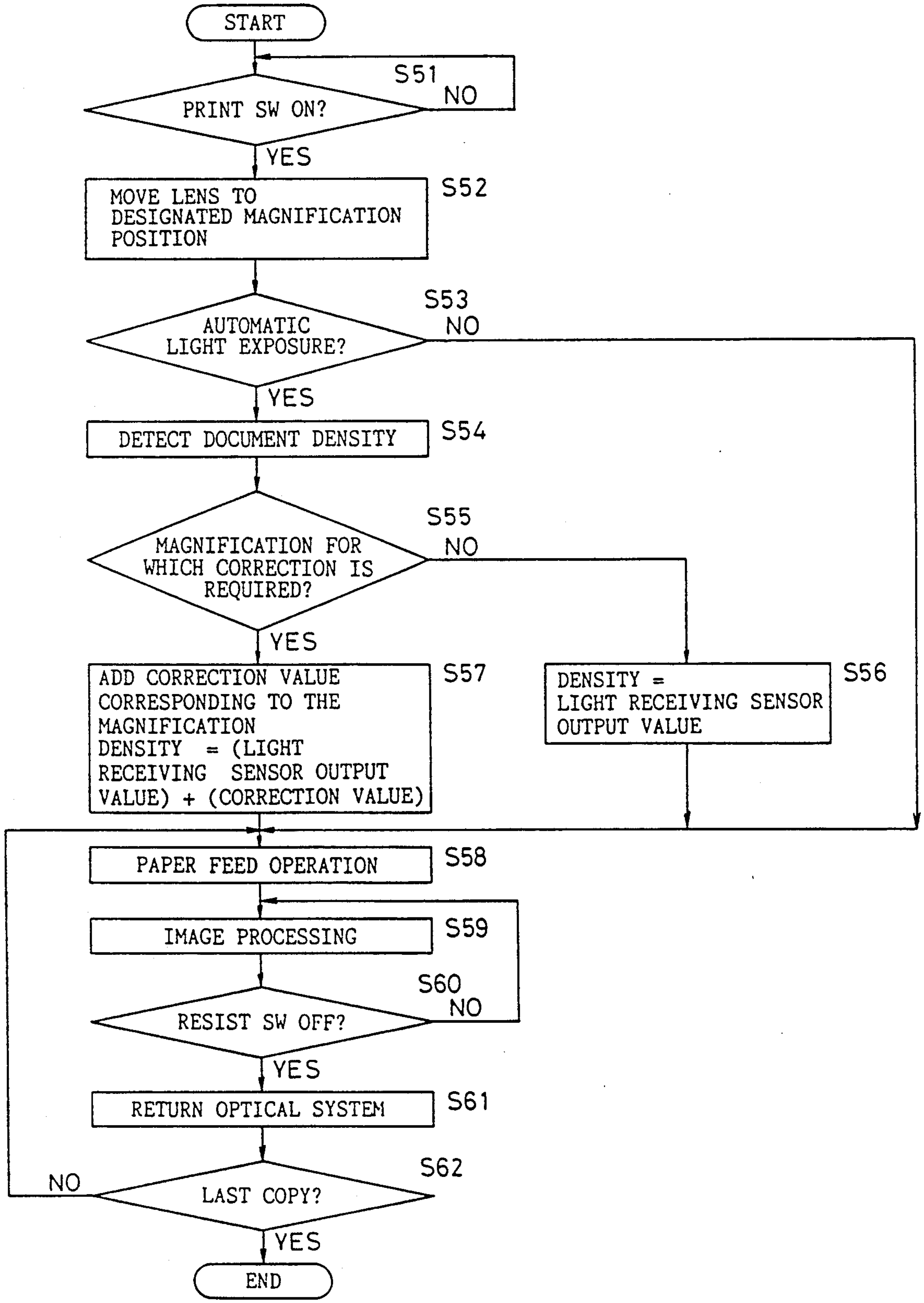
FIG. 10 a flowchart of control operations of the document density detector apparatus in accordance with the second embodiment of the present invention is applied.

FIG. 10 is a flowchart of the operations of the control circuit above-mentioned. The following description will discuss the operations of the document density detector apparatus along the flow in FIG. 10 with reference to FIG. 2 or FIG. 9.

When the CPU 42 judges that the print switch on the operation unit 43 is turned ON (step S51), the focal lens 21 is moved to the position corresponding to the copying magnification designated at the opration unit 43 (step S52).

Thus, this embodiment is arranged such that the focal lens 21 is moved to the designated magnification position after the print switch has been turned ON. However, provision may be made such that the focal lens 21 is immediately moved to the designated magnification position when the copying magnification is entered through the operation unit 43.

Then, the CPU 42 judges the ON/OFF state of an automatic light exposure switch (not shown) of the operation unit 43 (step S53). When the automatic light exposure switch is ON, the document 11 is pre-illuminated and scanned and, based on an amount of light received by the light sensor 41, the density of a document is detected (step S54).

The CPU 42 judges whether or not the designated copying magnification is one for which correction is required (step S55). If the tip of the focal lens 21 is stopped at the position El, E2, E3 or E4 which is located at the document side with respect to the position EQ as discussed in connection with FIG. 8, the correction is required for the copying magnification. In this case, the CPU 42 reads the correction value corresponding to the lens position, stored in the memory 50, and the correction value thus read is added to the output of the light sensor 41, thereby to correct the document density (step S57).

When the focal lens 21 is stopped at a position corresponding to a copying magnification for which no correction is required, the output of the light sensor 41 as it is, is determined as the document density (step S56).

The document density thus obtained is stored in a work area or the like of the memory 50. Based on the document density thus stored, the lamp control circuit 49 is controlled to adjust the luminous intensity of the lamp 15L, thereby to optimize the copy density, at the time of an image processing of a step S59 to be discussed later. In this embodiment, the density is adjusted by adjusting the luminous intensity of the lamp 15L. Alternately, the copy density may be optimized by adjusting the voltage of the corona discharger 24 or the developing bias voltage of the developing device 26. Further, the copy density may be adjusted by controlling, in combination, at least two items of the lamp 15L, the corona discharger 24 and the developing device 26 which contribute to the copy density above-mentioned.

When the automatic light exposure switch is OFF at the step S53, the control operations above-mentioned are skipped.

Then, the CPU 42 causes the paper feed rollers 32 to start paper feed (step S58) and, based on the fact that the resist switch 44 is turned ON, the optical motor 46 is forwardly rotated to adjust the lamp voltage as above-mentioned. Then, the image processing including illumination and scanning of the document 11 is executed (step S59). The rear end of the paper thus fed (in other words, the rear end of the document 11) is detected based on the fact that the resist switch 44 is switched to OFF (step S60). The optical motor 46 is then reversely rotated to return the lamp unit 15 to the stop position (step S61).

The control operations of the steps S58 to S62 are repeated until the document 11 is copied by the preset number of copies. When it is judged that the document 11 has been copied by the preset number of copies, i.e., when the light exposure operation is complete for the last copy or when the last copy paper is discharged to the paper discharge tray 35 (step S62), the control operations are finished.

Figure 11:
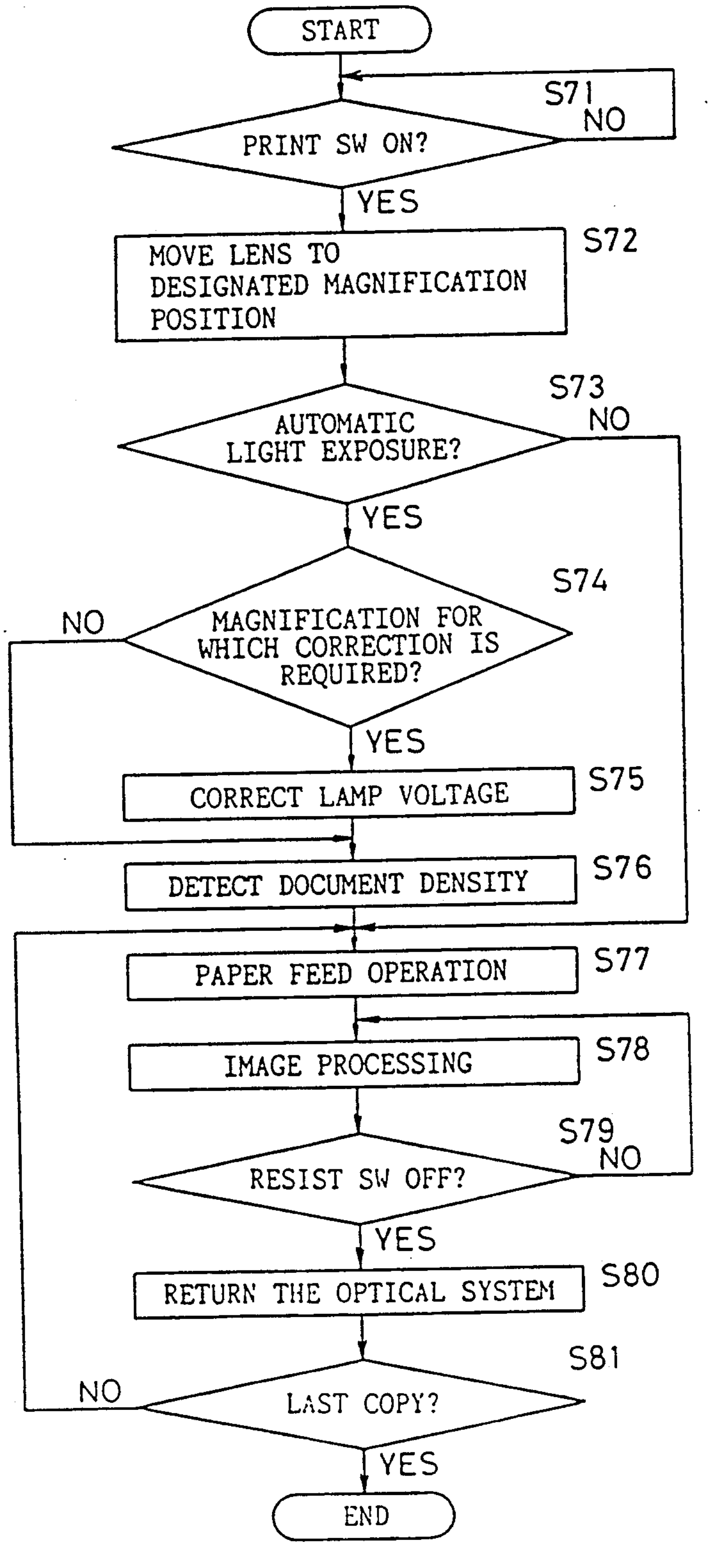
FIG. 11 is a flowchart of another operations of the control circuit in FIG. 9.

FIG. 11 is a flowchart of another control operations of the control circuit in FIG. 9. By this control circuit in FIG. 9, the control operations shown in FIG. 11 may be made instead of the control operations shown in FIG. 10. The following description will discuss the control operations along the flow in FIG. 11.

When the CPU 42 judges that the print switch of the operation unit 43 is turned ON (step S71), the focal lens 21 is moved to the position corresponding to the copying magnification designated at the operation unit 43 (step S72).

Then, the CPU 42 judges the ON/OFF state of the automatic light exposure switch (not shown) of the operation unit 43 (step S73). When the automatic light exposure switch is ON, it is then judged whether or not the designated copying magnification is magnification for which correction is required (step S74). If the tip of the focal lens 21 is located in the position E1, E2, E3 or E4 as discussed in connection with FIG. 8, the correction is required for the copying magnification. In this case, the CPU 42 causes the lamp control circuit 49 to correct the luminous intensity of the lamp 15L (step S75).

More specifically, if the designated copying magnification is one for which correction is required, the light incident on the light sensor 41 is partially intercepted (See FIG. 8). Accordingly, the amount of light received by the light sensor 41 is decreased. To compensate such decrease, the voltage applied to the lamp 15L is corrected to increase the luminous intensity of the lamp 15L. The relationship between this applied voltage and the copying magnification is, for example, as shown in Table 1, and previously stored in the memory 50. With the voltage applied to the lamp 15L set to a high value, the document 11 is pre-illuminated and scanned. Based on the amount of light received at this time by the light sensor 41, the document density is detected (step S76).

TABLE 1

| Copying Magnification | Voltage Applied to the Lamp |
|---|---|
| 100% or less | 50 V |
| 101 to 110% | 55 V |
| 111 to 120% | 60 V |
| 121 to 130% | 65 V |
| 131% or more | 70 V |

Thereafter, likewise in the control shown in FIG. 10, the paper feed rollers 32 start feeding copy paper (step S77) and, based on the fact that the resist switch 44 is turned ON, the optical motor 46 is forwardly rotated. Based on the document density detected at the step S76, the voltage applied to the lamp 15L is adjusted, and the image processing is executed (step S78). The lamp voltage in this case, is generally lower than the lamp voltage corrected at the step S75. That is, the lamp voltage corrected at the step S75 is an increased voltage to turn up the lamp 15L such that, even though the light incident on the light sensor 41 is partially intercepted by the focal lens 21, such interception does not exert an influence on the amount of light detected by the light sensor. On the other hand, in the image processing at the step S78 above-mentioned, the adjustment of the lamp voltage is made in order to properly maintain the document density, and has no relation with the fact that the light is partially intercepted or not.

Based on the fact that the resist switch 44 is switched to OFF, the CPU 42 detects the rear end of the copy paper (step S79) and reversely rotates the optical motor 46 to return the lamp unit 15 to the stop position (step S80). The control operations of the steps S77 to S81 are repeated until the document is copied by the preset number of copies. When it is judged that the document has been copied by the preset number of copies (step S81), the control operations are finished.

Since the document density detector apparatus in accordance with the second embodiment is arranged as above-mentioned, the density of a document may be automatically detected accurately at all time. In particular, when the apparatus of the present invention is applied to a copying apparatus capable of reading the document as enlarged or reduced at the desired magnification, the accurate density of a document may be detected regardless of the magnification used at the time of reading the document.

[IV] Third Embodiment

A third embodiment of the present invention is such that the document density detector apparatus in accordance with the first embodiment is applied to a copying apparatus having a reference white plate.

To automatically adjust the density of a document in a conventional copying apparatus, it is required to always maintain the light source for light exposure at a predetermined luminous intensity. With attention placed to this fact, there has been proposed an image forming apparatus in which a standard white plate (reference document) is illuminated by the light source, the light reflected therefrom is received by a light receiving device such as a photosensor, the output of the light receiving device is compared with a reference value, and the voltage applied to the light source is controlled such that both values are identical with each other, thereby to optimize the density of an image formed (See Japanese Unexamined Patent Publication No. 60-184240/1985).

It is a main object of the third embodiment of the present invention to provide improvements in the image forming apparatus above-mentioned such that the brightness of the reference document (standard white plate) is accurately detected.

Figure 12:
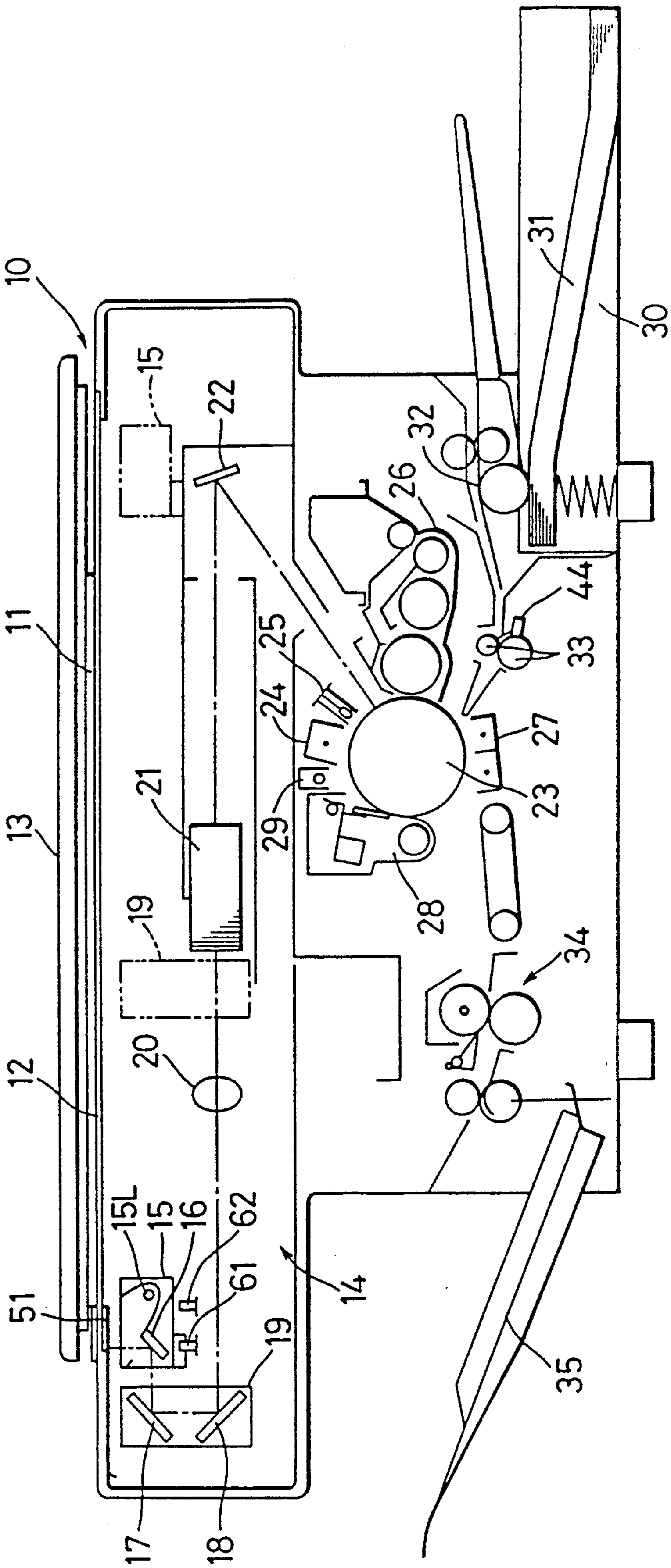
FIG. 12 a schematic view of the inner arrangement of an electrophotographic copying apparatus 10 to which a third embodiment of the present invention is applied.

FIG. 12 is a section view of a copying apparatus 10, illustrating the schematic arrangement thereof. The copying apparatus in FIG. 12 is different from the copying apparatus in FIG. 2 in that a reference document 51 is attached to the tip underside of a transparent platen 12 and this reference document 51 is illuminated by a lamp 15L.

Figure 13:
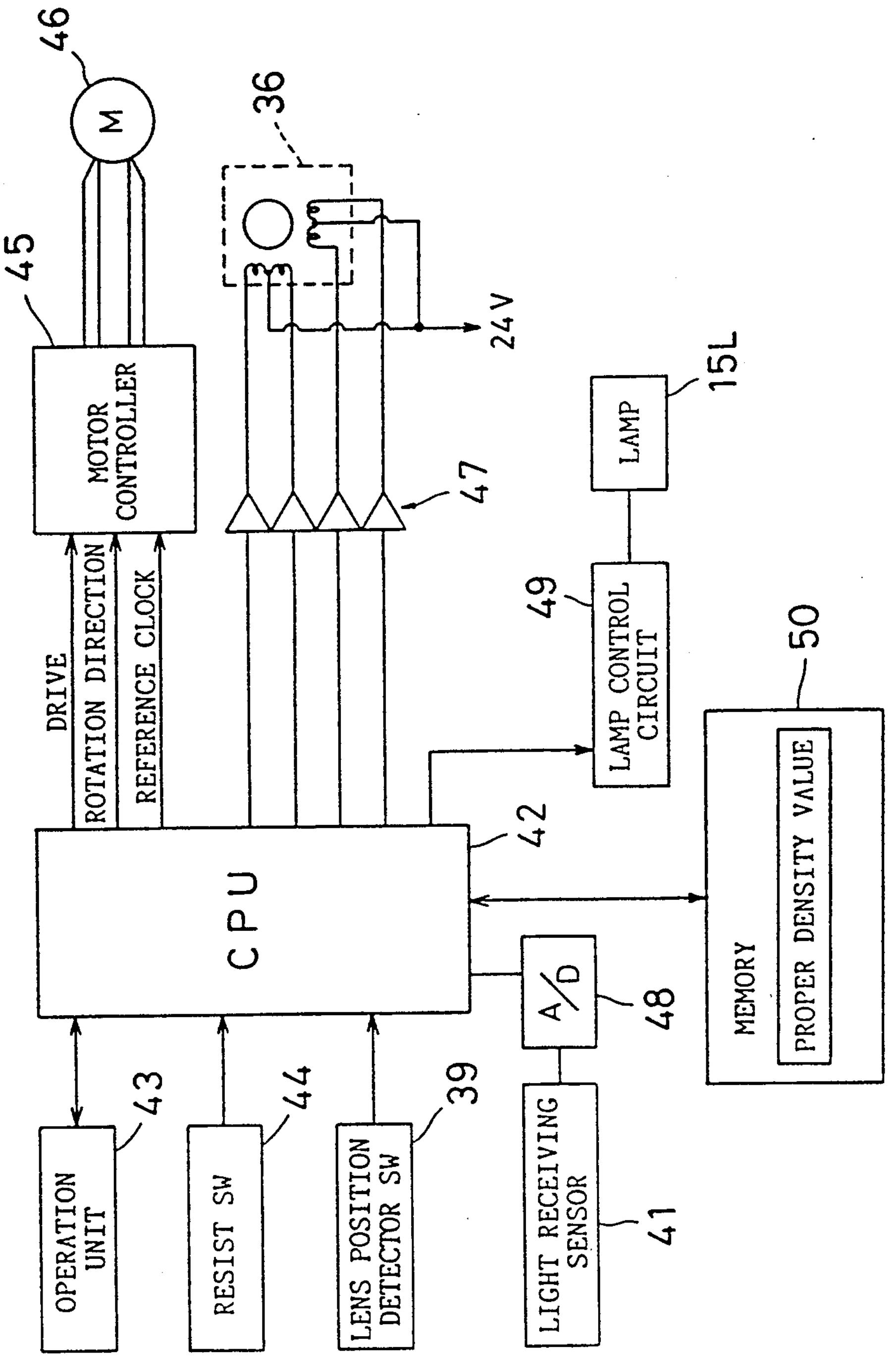
FIG. 13 is a block diagram of a control circuit of the electrophotographic copying apparatus 10 to which the third embodiment of the present invention is applied.

FIG. 13 is a block diagram of an electric control circuit in the copying apparatus 10. The control circuit is arranged with a CPU 42 located in the center thereof. Likewise in the embodiment shown in FIG. 4, the control circuit includes an operation unit 43, a resist switch 44, a lens position detector switch 39 and an analogue/-digital converter 48.

The CPU 42 is connected to a memory 50 which contains a preset proper density value.

The CPU 42 is adapted to control the rotation timing, the rotation time and the rotation direction of an optical motor 46 through a motor controller 45, and to control the lens motor 36 through the driver 47. Further, the CPU 42 is adapted to control a lamp control circuit 49 to increase or decrease the voltage applied to a lamp 15L for light exposure. Thus, the luminous intensity of the lamp 15L may be adjusted.

The operations by the control circuit above-mentioned are represented by a timing chart identical with that shown in FIG. 5 (A) when automatic detection of the document density is not to be made (with the automatic light exposure switch turned OFF), or a timing chart identical with that shown in FIG. 5 (B) when automatic detection of the document density is to be made (with the automatic light exposure switch turned ON). It is therefore avoided to show these timing charts again.

Figure 14:
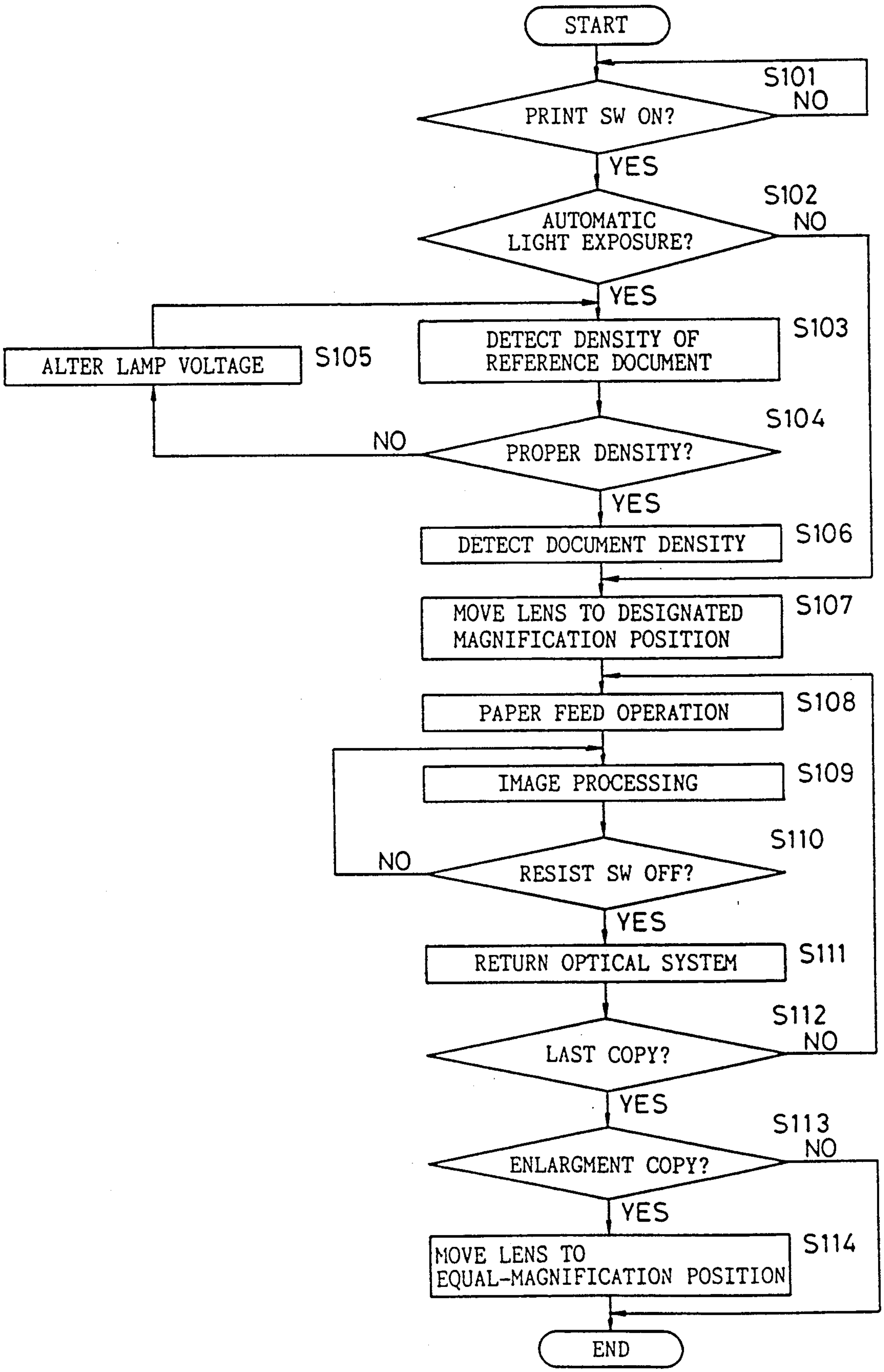
FIG. 14 is a flowchart of operations of the control circuit in FIG. 13.

FIG. 14 is a flowchart illustrating the operations of the control circuit in FIG. 13.

The following description will discuss the operations of the control circuit along the flow in FIG. 14 with reference to FIG. 12 or FIG. 5.

When the CPU 42 judges that the print switch of the operation unit 43 has been turned ON (step S101), the CPU 42 then judges the ON/OFF state of the automatic light exposure switch (step S102). When the automatic light exposure switch is ON, the light exposure apparatus 14 is operated such that the reference document 51 is illuminated by the lamp 15L. The light reflected from the document 51 is received by the light sensor 41. Based on the amount of light thus received, the density of the reference document 51 is detected (step S103), and it is judged whether or not the density of the reference document thus detected is proper (step S104). Such a judgment is made by comparing the detected density of the reference document with a preset proper density value stored in the memory 50. As the result of the comparison, if the detected density value is not identical with the stored proper density value, the CPU 42 controls the lamp control circuit 49 to change the voltage applied to the lamp 15L (step S105). The density of the reference document 51 is again detected (step S103), and it is then judged whether or not the density value thus detected is identical with the proper density value stored in the memory 50 (step S104). By repeating the control operations of the steps S103 to S105, the brightness of the lamp 15L is adjusted to a predetermined value.

More specifically, to achieve automatic detection of the density of a document, it is required to maintain the brightness of the lamp 15L constant at all times. In this connection, the reference document 51 having a white color as a reference may be illuminated and, based on the light reflected from this reference document 51, the voltage applied to the lamp 15L may be controlled to maintain the brightness of the lamp 15L constant at all times.

After the voltage applied to the lamp 15L has been thus adjusted, the document 11 is pre-illuminated and scanned by the light exposure apparatus 14. Based on the amount of light detected by the light sensor 41 at this time, the density of the document 11 is detected (step S106).

Based on the density thus detected, the lamp control circuit 49 is controlled, at a step S109 of image processing to be discussed later, such that the brightness of the lamp 15L is adjusted to optimize the copy density.

According to this embodiment, the adjustment of the density of the document 11 is made by adjusting the brightness of the lamp 15L. Alternately, the copy density may be optimized by adjusting the voltage applied to the corona discharger 24 or the developing bias voltage of the developing device 26. Further, the copy density may be adjusted by controlling, in combination, at least two items of the lamp 15L, the corona discharger 24 and the developing device 26 which contribute to the copy density.

When the automatic light exposure switch is OFF, the control operations of S103 to S106 are skipped.

Then, to provide the copy magnification designated at the operation unit 43, the CPU 42 drives the lens motor 36 to move the focal lens 21 to the position corresponding to the designated copy magnification (step S107). Then, the CPU 42 causes the paper feed rollers 32 to start feeding copy paper (step S108). Based on the fact that the resist switch 44 is turned ON, the optical motor 46 is forwardly rotated to execute the image processing including the illumination and scanning of the document 11 (step S109: See FIG. 5). At this time, the lamp control circuit 49 is controlled, as mentioned earlier, to adjust the luminous intensity of the lamp 15L such that the copy density is optimized.

Then, the rear end of the copy paper fed (in other words, the rear end of the document 11) is detected by the fact that the resist switch 44 is switched to OFF (step S110). This causes the optical motor 46 to be reversely rotated to return the lamp unit 15 to the stop position (step S111).

The control operations of the steps S108 to S112 are repeated until the document is copied by the preset number of copies. When it is judged that the document has been copied by the preset number of copies, i.e., when the light exposure operation is complete for the last copy or when the last copy paper is discharged to the paper discharge tray 35 (step S112), it is then judged whether or not the copy mode has been an enlargement copy mode (step S113). When the mode has been an enlargement copy mode, the focal lens 21 is returned to the equal-magnification position as the reference position by the lens motor 36 (step S114).

Thus, it is one of the characteristics of this control that the focal lens 21 is always returned to the equal-magnification position after the enlargement copy has been made. With such an arrangement, when automatically detecting the densities of the reference document 51 and the next document 11, the focal lens 21 is always located in the equal-magnification position. This eliminates the danger that the light incident on the light sensor 41 is intercepted by the focal lens 21.

In the control operations shown in FIG. 14, only when it has been judged at the step S102 that automatic detection of the document density is to be made, the control operations of the steps S103, S104 and S105 are made to adjust the voltage applied to the lamp 15L. However, the steps S103, S104 and S105 may be executed even though automatic detection of the document density is not to be made. In particular, when the lamp 15L is under deterioration or the mirrors in the optical pass are contaminated due to long-term use, or if the ambient temperature undergoes a remarkable change, it is indispensable to detect the density of the reference document 51 to adjust the brightness of the lamp 15L. The control operations of the steps S103 to S105 are provided for this purpose. Accordingly, even though the operator manually adjusts the density of a document, the brightness of the lamp 15L is adjusted to a predetermined value at all times. This advantageously stabilizes the document density.

Alternately, the developing bias or the electrified voltage of the drum 23 may be changed, instead of detecting the density of the reference document 51 to adjust the brightness of the lamp 15L. That is, the control may be made in order of the steps S101 S103 S107, and the lamp 15L, the developing bias or the electrified voltage may be adjusted at the step S109 of image processing, based on the detected output at the step S103.

Figure 15:
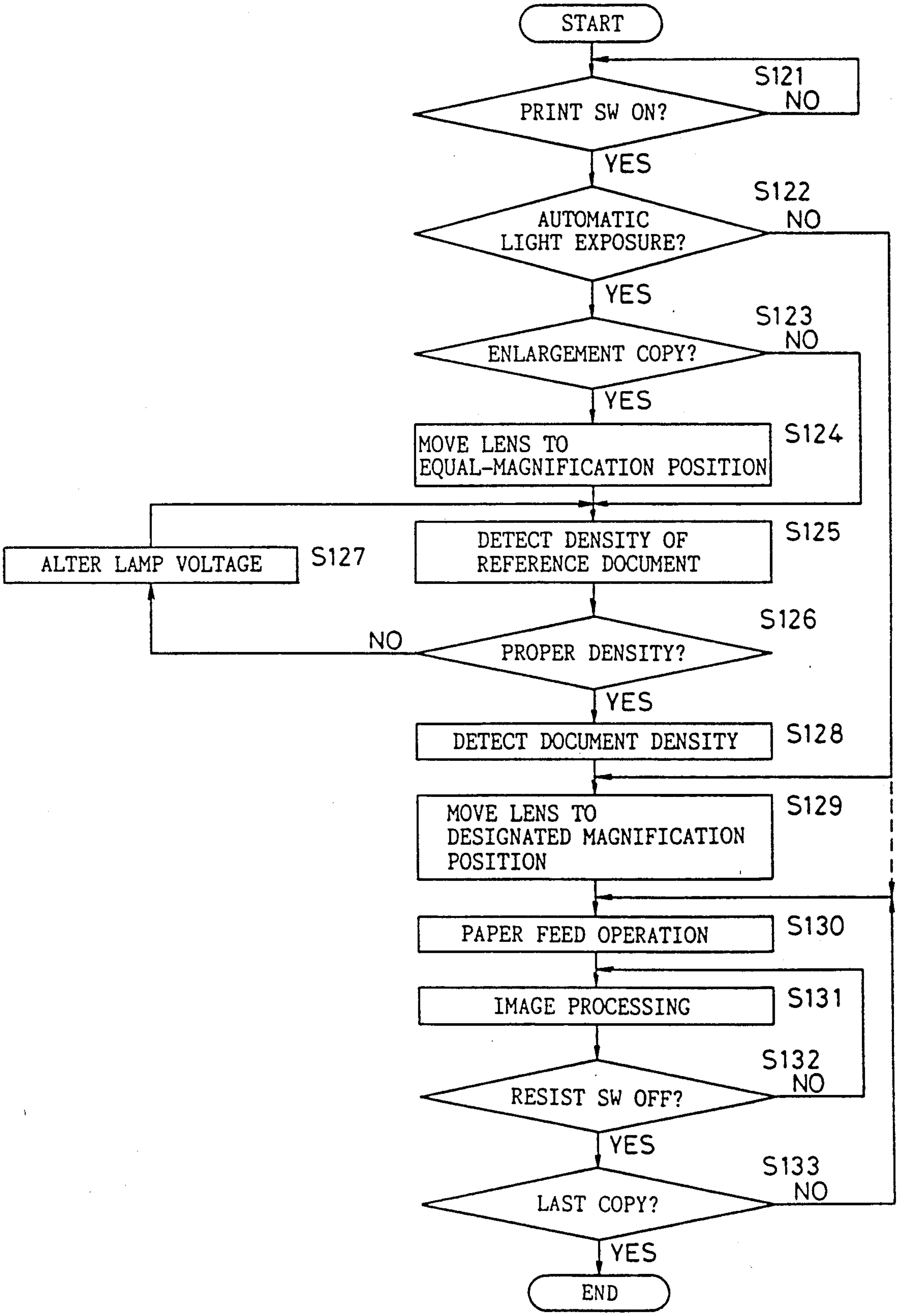
FIG. 15 is a flowchart of another example of the control operations of the electrophotographic copying apparatus 10.

FIG. 15 is a flowchart of another control operations of the control circuit in FIG. 13. By this control circuit, the control operations shown in FIG. 15 may be made instead of the control operations discussed in connection with FIG. 14. The following description will discuss the control operations along the flow in FIG. 15.

When the CPU 42 judges that the print switch is turned ON (step S121), the CPU 42 then judges the ON/OFF state of the automatic light exposure switch (step S122). When the automatic light exposure switch is ON, it is judged whether or not the the mode is an enlargement copy mode (step S123). In the affirmative, the focal lens 21 moved toward the document, is moved to the equal-magnification position by the lens motor 36

(step S124). When the mode is not an enlargement copy mode, the focal lens 21 is let remain at the position where it is.

As shown above, it is the characteristics of these control operations that, for the enlargement copy mode, the focal lens 21 is always once moved to the equal-magnification position as the reference position before detecting the densities of the reference document 51 and the document 11.

The control operations at the steps S125, S126 and S127 of detection of the density of the reference document 51 and the subsequent alteration of the voltage to be applied to the lamp 15L based on the density thus detected, are the same as those at the steps S103, 104 and S105 in FIG. 14. Further, the detection of the document density at the step S128 is also the same as that at the step S106 in FIG. 14.

As described above, the density of the reference document 51 is detected and, based on the density thus detected, the voltage applied to the lamp 15L is adjusted, after which the density of the document 11 is detected.

After completion of the detection of the document density, the focal lens 21 is moved to the position corresponding to the designaged copying magnification (step S129). Likewise in the operations along the flowchart in FIG. 14, the paper feed (step S130) and the image processing (step S131) based on the document density detected at the step S128, are executed until the last copy is complete (steps S130 to S133).

In the foregoing, the description has been made of the control operations of the type in which the focal lens 21 is moved to the position corresponding to the designated copying magnification immediately before the copying operation is made, i.e., after the print switch has been turned ON. However, there are also available control operations of the type in which the focal lens is moved to the position corresponding to the designated copying magnification before the print switch is turned ON. In the control operations of this type, when the automatic light exposure switch is OFF (step S122), the sequence may immediately proceed to the step S130 of paper feed (See the operation shown by a dotted line in FIG. 15).

Since the document density detector apparatus in accordance with the third embodiment is arranged as above-mentioned, the brightness of the lamp for illuminating the document, the developing bias, the electrified voltage and the like may be properly adjusted. Accordingly, the density of a document may be automatically adjusted to the desired density. In particular, when the apparatus of the present invention is applied to a copying apparatus capable of reading a document at the desired magnification, the voltage applied to the lamp, the developing bias, the electrified voltage and the like may be properly adjusted regardless of the magnification used at the time of reading the document.

[V] Fourth Embodiment

The third embodiment of the present invention is arranged such that, when the light sensor 41 is to receive the light, the focal lens 21 is moved to a predetermined reference position such that the focal lens 21 does not intercept the light incident on the light sensor 41.

According to a fourth embodiment of the present invention, provision may be made such that, when the light incident on the light sensor 41 is partially intercepted by the focal lens 21, the signal output of the light sensor 41 is processed to correct such output. The following description will discuss in more detail the fourth embodiment having the arrangement above-mentioned.

In the following description, there is applied FIG. 8 for schematically illustrating the relationship between the focal lens 21 tip positions El to EQ and the interception ratios of the light incident on the light sensor 41.

The electric control circuit of the document density detector apparatus of the fourth embodiment, has the same arrangement as shown in FIG. 9, and is therefore not shown again. For convenience sake, FIG. 9 is also used in the following description.

Figure 16:
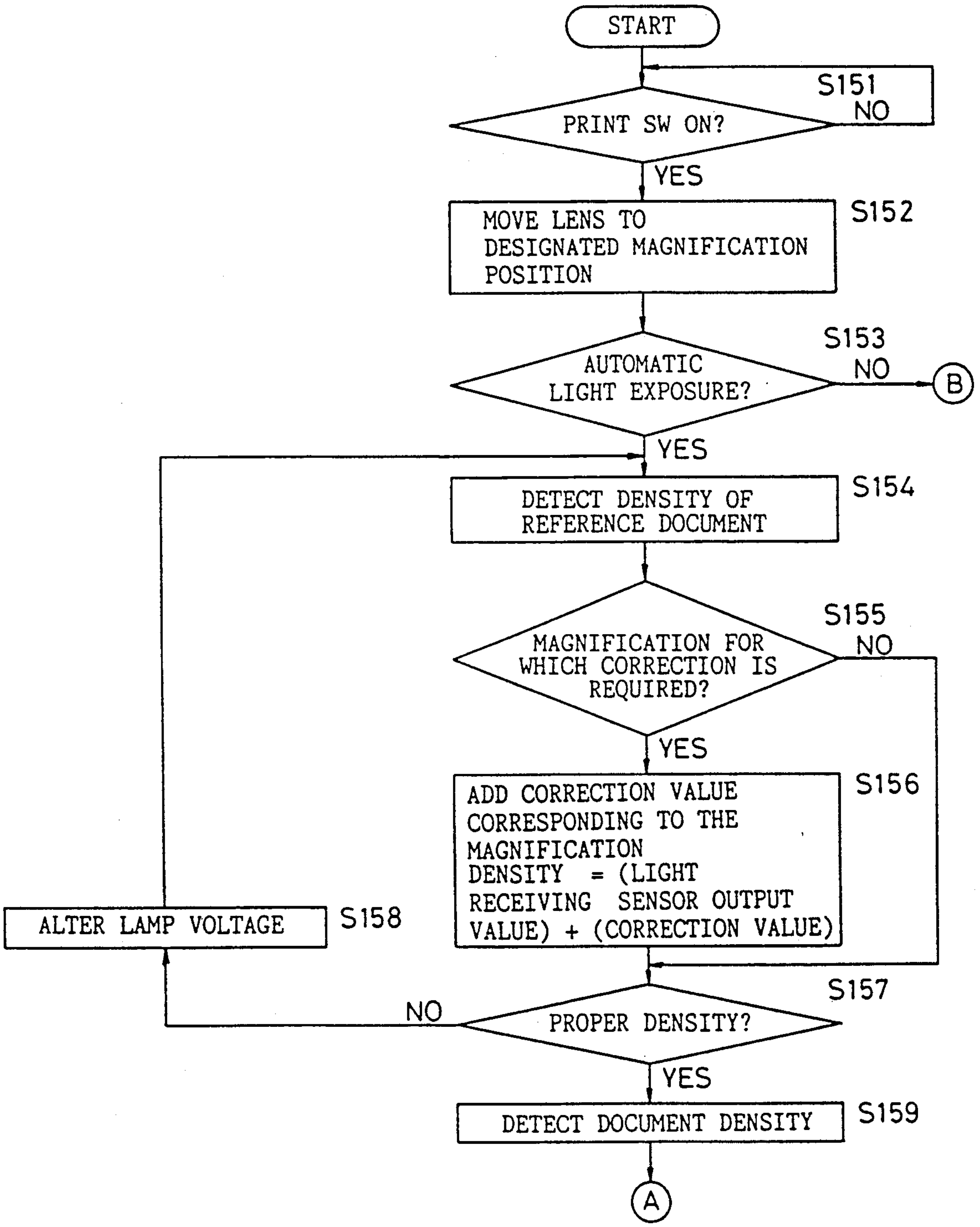
FIGS. 16A, 16B is a flowchart of control operations of an electrophotographic copying apparatus 10 to which a fourth embodiment of the present invention is applied.
Figure 16:
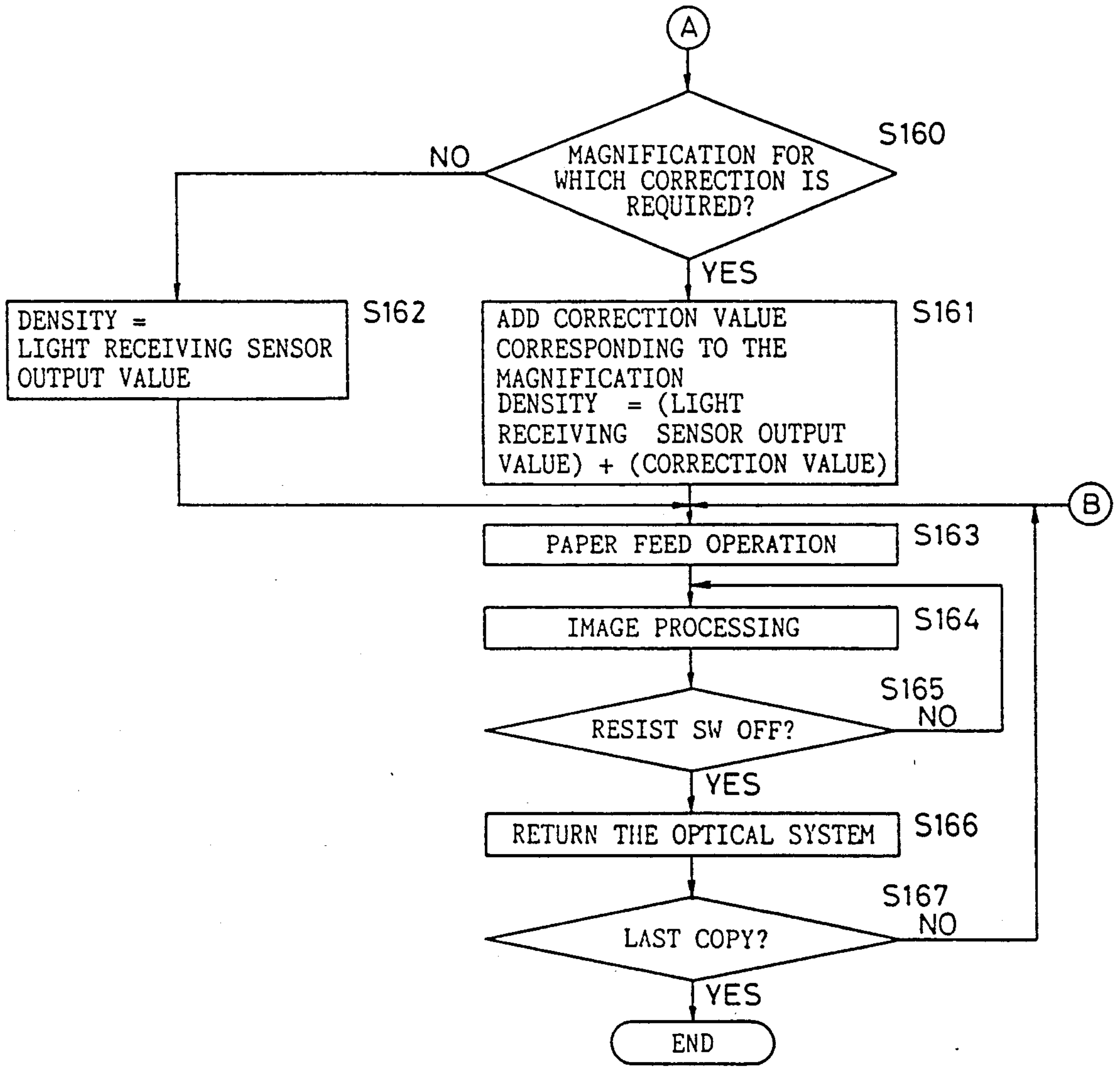

FIG. 16 is a flowchart of the control operations made in this embodiment. The following description will discuss the operations according to this fourth embodiment along the flow in FIG. 16 with reference to FIG. 12, FIG. 13, FIG. 8 and FIG. 9.

When the CPU 42 judges that the print switch is turned ON (step S151), the focal lens 21 is moved to the position corresponding to the copying magnification designated at the operation unit 43 (step S152).

The fourth embodiment employs the arrangement that the focal lens 21 is moved to the designated magnification position after the print switch has been turned ON. Alternately, provision may be made such that the focal lens 21 is immediately moved to the position corresponding to the designated magnification when the copying magnification is entered through the operation unit 43.

Then, the CPU 42 judges the ON/OFF state of the automatic light exposure switch (not shown) of the operation unit 43 (step S153). When the automatic light exposure switch is ON, the lamp 15L comes ON to illuminate the reference document 51. The light reflected from the reference document 51 is received by the light sensor 41 to detect the density of the reference document 51 (step S154). At this time, when the mode is an enlargement copy mode, the focal lens 21 is stopped at the position E1, E2, E3 or E4 as discussed in connection with FIG. 8. Accordingly, the light incident on the light sensor 41 is partially intercepted by the tip of the focal lens 21. Then, the CPU 42 judges whether or not the designated magnification is magnification for which correction is required (step S155). When it is judged that correction is required for the magnification, the CPU 42 reads the correction value, stored in the memory 50, corresponding to the tip position of the focal lens 21 and the correction value thus read is added to the output of the light sensor 41. Accordingly, the density is corrected (step S156). Thus, a signal processing is executed such that, even though the light incident on the light sensor 41 is partially intercepted by the focal lens 21, such interception exerts no influence on the output of the light sensor 41.

It is then judged whether or not the detected density of the reference document 51 is proper. Such a judgment is made by comparing the proper density value previously stored in the memory 50 with the detected (or detected and corrected) density value of the reference document (step S157).

When the detected (or detected and corrected) density value is not identical with the stored proper density value, the CPU 42 controls the lamp control circuit 49 to change the voltage applied to the lamp 15L (step S158). The density of the reference document 51 is again detected, and such control operations are repeated until the detected density value of the reference document is identical with the stored proper density value (steps S154 to S158).

The voltage applied to the lamp 15L is thus adjusted. As the result, the luminous intensity of the lamp 15L is maintained constant at all times. Accordingly, the deterioration of the lamp, the variations of the ambient temperatures and the like, if any, exert no influence upon the copy density.

Then, the CPU 42 causes the light exposure apparatus 14 to execute pre-illumination and scanning of the document 11, and, based on the amount of light received at this time by the light sensor 41, the density of the document is detected (step S159). At this time, it is the voltage adjusted at the steps S154 to S158 above-mentioned that is applied to the lamp 15L.

Then, the CPU 42 judges whether or not the designated magnification is one for which correction is required (step S160). If the mode is an enlargement copy mode such that the tip of the focal lens 21 is located in the position El, E2, E3 or E4 as discussed in connection with FIG. 8, this mean that correction is required for the magnification. In this case, the CPU 42 reads the correction value, stored in the memory 50, corresponding to the lens position, and the correction value thus read is added to the output of the light sensor 41. Thus, the corrected density value is supplied (step S161).

When the designated magnification is one for which no correction is required, the output of the light sensor 41 as it is, is supplied as the density value (step S162).

Then, based on the document density thus obtained, the lamp control circuit is controlled to adjust the luminous intensity of the lamp 15L to optimize the copy density, at a step S164 to be discussed later. In this embodiment, the adjustment of the density of the document 11 is made by adjusting the luminous intensity of the lamp 15L. Alternately, the copy density may be optimized by adjusting the voltage applied to the corona discharger 24 or the developing bias voltage of the developing device 26. Further, the copy density may be adjusted by controlling, in combination, at least two items of the lamp 15L, the corona discharger 24 and the developing device 26 which contribute to the copy density above-mentioned.

When the automatic light exposure switch is OFF at the step S153, the control operations of the steps S154 to S162 above-mentioned are skipped.

Then, the CPU 42 causes the paper feed rollers 32 to start feeding copy paper (step S163), and based on the fact that the resist switch 44 is turned ON, the optical motor 46 is forwardly rotated to adjust the lamp voltage as mentioned earlier, thereby to execute an image processing including illumination and scanning of the document 11 (step S164). Based on the fact that the resist switch 44 is switched to OFF, the end of the fed paper is detected (step S165) and the optical motor 46 is reversely rotated to return the lamp unit 15 to the stop position (step S166). The control operations of the steps S163 to S167 are repeated until the document is copied by the preset number of copies. When it is judged that the document has been copied by the preset number of copies (step S167), the control operations are finished.

The following description will discuss another control operations. Table 2 is a memory map showing the relationship between the voltage applied to the lamp 15L and the copying magnification previously set in the memory 50. This memory map is required for the following control operations. In the following control operations, according to the tip position of the focal lens 21, i.e., the copying magnification, the corresponding voltage to be applied to the lamp 15L is read, and with this read voltage applied to the lamp 15L, the density of the reference document 51 is detected.

TABLE 2

| Copying Magnification | Voltage Applied to the Lamp |
|---|---|
| 100% or less | 50 V |
| 101 to 110% | 55 V |
| 111 to 120% | 60 V |
| 121 to 130% | 65 V |
| 131% or more | 70 V |

Figure 17:
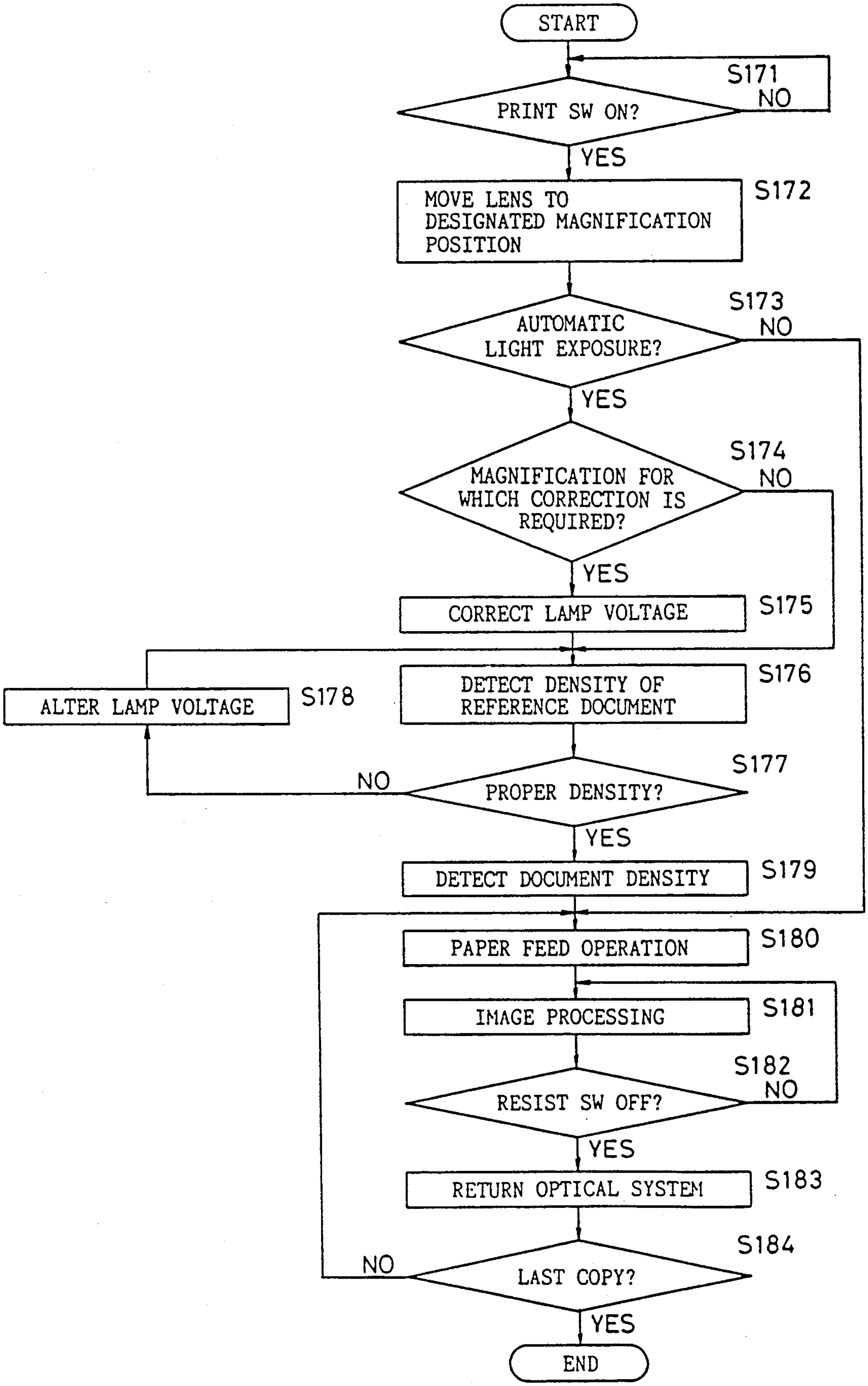
FIG. 17 is a flowchart of another example of the control operations of the electrophotographic copying apparatus 10 to which the fourth embodiment of the present invention is applied.
Figure 18:
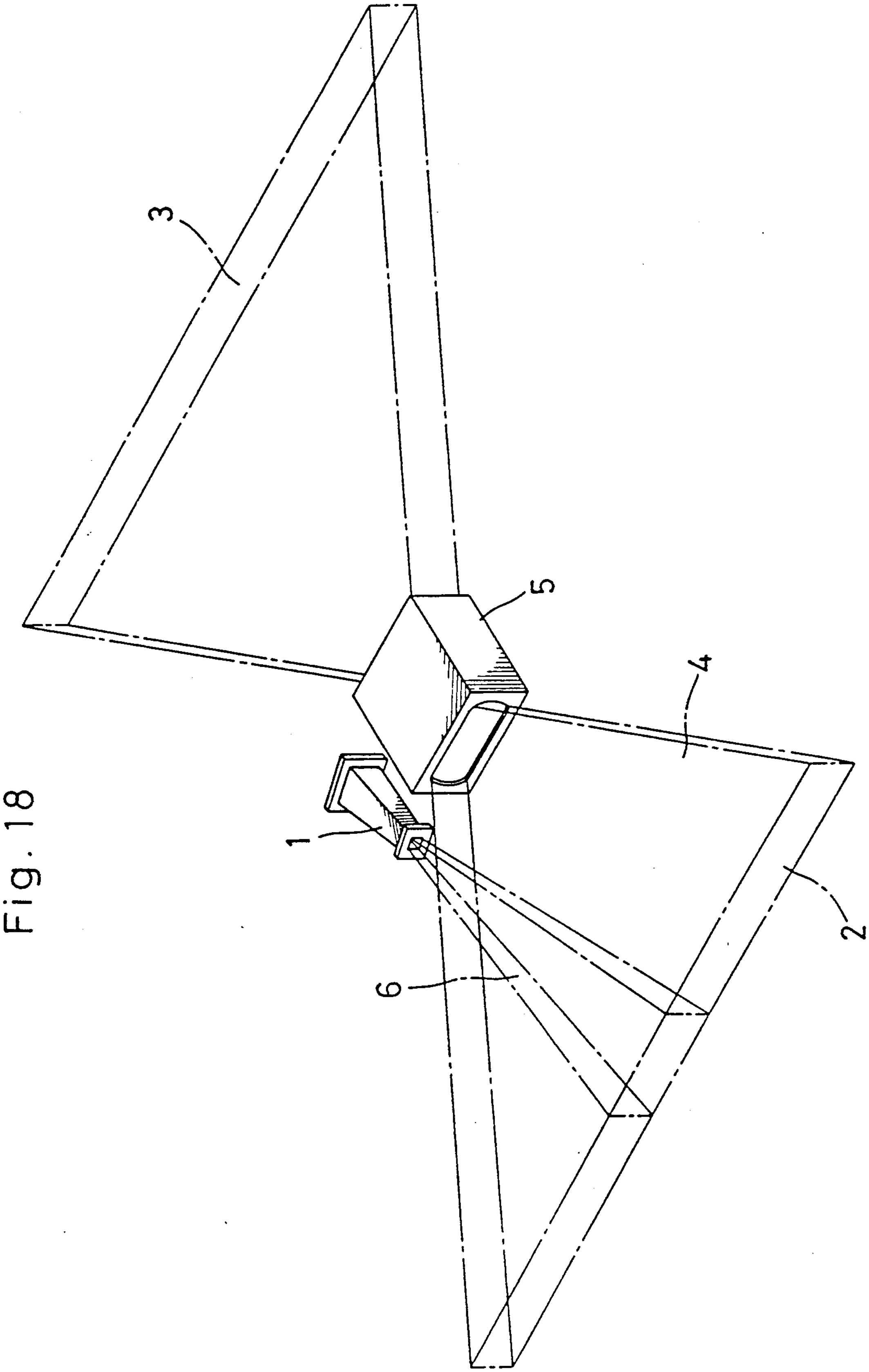
FIG. 18 and FIG. 19 are perspective and plan views, respectively, of a light exposure apparatus in a conventional analogue electrophotographic copying apparatus, developed along the light propagation area thereof.
Figure 19:
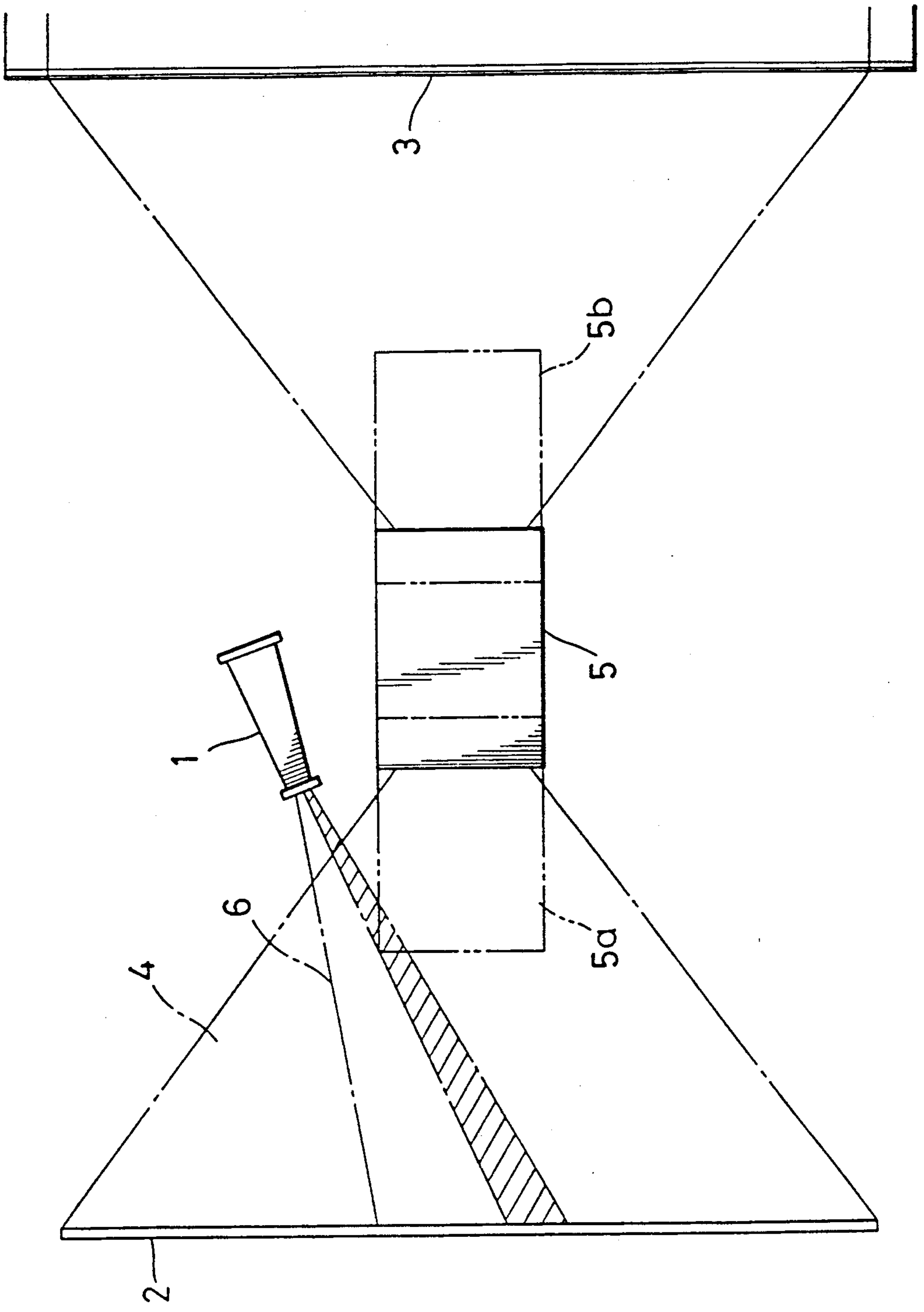

FIG. 17 is a flowchart of the control operations above-mentioned.

With reference to FIG. 17, when the CPU 42 judges that the print switch of the control portion 43 is turned ON (step S171), the focal lens 21 is moved to the position corresponding to the copying magnification designated at the operation unit (step S172).

Then, the CPU 42 judges the ON/OFF state of an automatic light exposure switch (not shown) of the operation unit 43 (step S173). When the automatic light exposure switch is ON, it is then judged whether or not the designated copying magnification is one for which correction is required (step S174). If correction is required, a voltage to be applied to the lamp 15L is read from the memory 50, and the lamp control circuit 49 is controlled (step S175). The lamp 15L is then lit with the voltage thus read. More specifically, when the copying magnification is one for which correction is required, the light incident on the light sensor 41 is partially intercepted by the focal lens 21. This decreases the amount of light received by the light sensor 41. To compensate such a decrease, the voltage applied to the lamp 15L is increased to turn up the lamp 15L.

The reference document 51 is illuminated, and the light reflected therefrom is received by the light sensor 41 to detect the density of the reference document 51 (step S176). It is judged whether or not the density value thus detected is proper by comparing the same with the proper density value stored in the memory 50 (step S177). Normally, both values should be identical with each other. However, there are instances where the density value of the reference document detected by the light sensor 41 is not identical with the proper density value due to, for example, variations of the ambient temperature or the deterioration of the lamp 15L resulting from its long-term use. In such a case, the voltage applied to the lamp 15L is changed (step S178) and the density of the reference document is again detected (step S176). By repeating the control operations of the steps S176, S177 and S178, the voltage applied to the lamp 15L is properly adjusted.

Then, the density of the document 11 is detected with the lamp 15L thus adjusted. Such a detection is made by driving the lamp unit 15 and pre-illuminating and scanning the document 11 (step S179). The document 11 density thus detected will be used for an image processing at a step S181.

After detection of the document density, the CPU 42 causes the paper feed rollers 32 to start feeding copy paper (step S180). Based on the fact that the resist switch 44 is turned ON, the optical motor 46 is forwardly rotated. Based on the document density detected at the step S179, the voltage applied to the lamp 15L is adjusted and the image processing is executed (step S181).

Based on the fact that the resist switch 44 is turned OFF, the CPU 42 detects the rear end of the copy paper (step S182) and reversely rotates the optical motor to return the lamp unit 15 to the stop position (step S183). Until the document is copied by the preset number of copies, the control operations of the steps S180 to S184 are repeated. When it is judged that the document has been copied by the preset number of copies (step S184), the control operations are finished.

In the foregoing, the description has been made of the arrangement in which the output of the light sensor 41 is corrected by a signal processing in the case where the light incident on the light sensor 41 is partially intercepted in the enlargement copy mode. However, even though the mode is other than the enlargement copy mode, there are instances where the light incident on the light sensor 41 is partially intercepted by the focal lens 21 due to the positional relationship between the light sensor 41 and the focal lens 21. In such a case, the similar control operations may be executed.

Since the document density detector apparatus in accordance with the fourth embodiment is arranged as above-mentioned, the brightness of the lamp for illuminating the document, the developing bias, the electrified voltage and the like may be properly adjusted. Accordingly, the document density may be automatically adjusted to the desired density. In particular, when the apparatus of the present invention is applied to a copying apparatus capable of reading the document at the desired magnification, the voltage applied to the lamp, the developing bias, the electrified voltage and the like may be properly adjusted regardless of the magnification used at the time of reading the document.

According to the first to fourth embodiments, the automatic light exposure mode is selected by switching the automatic light exposure switch. However, the present invention may be applied to an image forming apparatus previously provided only with an automatic light exposure function, i.e., an image forming apparatus for forming an image under automatic light exposure conditions in any case.

What is claimed is:

1. A document density detector apparatus to be used for an image forming apparatus in which a focal lens is disposed in an optical pass for guiding light reflected from the surface of a document, to the surface of a light receiving body, and a light sensor for detecting the density of the document is fixed outside of an area through which the light reflected from the surface of the document passes before illuminating a predetermined surface of said light receiving body, and in which an image of the document formed on said light receiving body may be enlarged or reduced at the desired magnification by moving said focal lens along the optical pass in the direction toward the document or toward said light receiving body, comprising:

reference position setting means for setting a reference position of said focal lens such that said light sensor receives the light reflected from the document without light interception by said focal lens;

first judging means for supplying a first judging signal when there is set copying magnification which causes said focal lens to be moved from said reference position toward a position nearer to the document;

second judging means for supplying a second judging signal when, before image forming, there is set a mode for executing automatic detection of the density of a document; and lens moving means for receiving said signals and for moving said focal lens to said reference position when said lens moving means receives said first and second judging signals from said first and second judging means, said light sensor being operable to sense the density of a document when said focal lens is at said reference position.

2. A document density detector apparatus according to claim 1, wherein the reference position is a position to which the focal lens is moved in a mode for image forming at equal-magnification, and the magnification which causes said focal lens to be moved to a position nearer to the document from the reference position, refers to enlargement magnification, and the first judging means is adapted to supply the first judging signal only when enlargement magnification is set.

3. A document density detector apparatus according to claim 1, wherein the reference position is a position to which the focal lens is moved in a mode for reduced-image forming at predetermined magnification, and the first judging means is adapted to supply the first judging signal only when there is set magnification greater than said predetermined magnification.

4. A document density detector apparatus according to claim 1, wherein the reference position is a position to which the focal lens is moved in a mode for enlarged-image forming at predetermined magnification, and the first judging means is adapted to supply the first judging signal only when there is set magnification greater than said predetermined magnification.

5. A document density detector apparatus according to claim 1, wherein, when image forming has been made for one document with the focal lens located in a position nearer to the document from the reference position, the moving means moves said focal lens to said reference position before an image forming start switch is operated for the next document.

6. A document density detector apparatus according to claim 1, wherein the moving means moves the focal lens to the reference position after an image forming start switch has been operated.

7. A document density detector apparatus to be used for an image forming apparatus in which a focal lens is disposed in an optical pass for guiding light reflected from the surface of a document, to the surface of a light receiving body, and a light sensor for detecting the density of the document is fixed outside of an area through which the light reflected from the surface of the document passes before illuminating a predetermined surface of said light receiving body, and in which an image of the document formed on said light receiving body may be enlarged or reduced at the desired magnification by movement of said focal lens along the optical pass in the direction toward the document or toward said light receiving body, comprising:

said light sensor being located in a position involving the likelihood that light reflected from the surface of the document to be received by said light sensor, is partially intercepted by said focal lens dependent on magnification in the image forming apparatus;

memory means previously containing the relationship between magnification and a correction value for the output of said light sensor;

judging means for judging the magnification being set in the image forming apparatus; and correcting means for reading an output correction value from said memory means according to the judged magnification, thereby to correct the output of said light sensor.

8. A document density detector apparatus to be used for an image forming apparatus in which a focal lens is disposed in an optical pass for guiding light projected by a light source to the surface of a document and reflected therefrom, to the surface of a light receiving body, and a light sensor for detecting the density of the document is fixed outside of an area through which the light reflected from the surface of the document passes before illuminating a predetermined surface of said light receiving body, and in which an image of the document formed on said light receiving body may be enlarged or reduced at the desired magnification by movement of said focal lens along the optical pass in the direction toward the document or toward said light receiving body, comprising:

said light sensor being located in a position involving the likelihood that light reflected from the surface of the document to be received by said light sensor, is partially intercepted by said focal lens dependent on magnification in the image forming apparatus;

memory means previously containing the relationship between magnification and the light amount control value corresponding to the light amount of said light source;

judging means for judging the magnification being set in the image forming apparatus; and correcting means for reading a light amount control value from said memory means according to the judged magnification, thereby to correct the light amount of said light source.

9. A document density detector apparatus to be used for an image forming apparatus in which a focal lens is disposed in an optical pass for guiding light reflected from the surface of a document, to the surface of a light receiving body, and a light sensor for detecting the density of the document is fixed outside of an area through which the light reflected from the surface of the document passes before illuminating a predetermined surface of said light receiving body, and in which an image of the document formed on said light receiving body may be enlarged or reduced at the desired magnification by moving said focal lens along the optical pass in the direction toward the document or toward said light receiving body, comprising:

reference position setting means for setting a reference position of said focal lens such that said light sensor receives the light reflected from the document without light interception by said focal lens;

first judging means for supplying a first judging signal when there is set copying magnification which causes said focal lens to be moved from said reference position toward a position nearer to the document;

lens moving means for receiving said signal and for moving said focal lens to said reference position when said lens moving means receives said first judging signal from said first judging means, said light sensor being operable to sense the density of a document when said focal lens is at said reference position.

10. A document density detector apparatus according to claim 9, wherein the reference position is a position to which the focal lens is moved in a mode for image forming at equal-magnification, and the magnification which causes said focal lens to be moved to a position nearer to the document from the reference position, refers to enlargement magnification, and the first judging means is adapted to supply the first judging signal only when enlargement magnification is set.

11. A document density detector apparatus according to claim 9, wherein the reference position is a position to which the focal lens is moved in a mode for reduced-image forming at predetermined magnification, and the first judging means is adapted to supply the first judging signal only when there is set magnification greater than said predetermined magnification.

12. A document density detector apparatus according to claim 9, wherein the reference position is a position to which the focal lens is moved in a mode for enlarged-image forming at predetermined magnification, and the first judging means is adapted to supply the first judging signal only when there is set magnification greater than said predetermined magnification.

13. A document density detector apparatus according to claim 9, wherein, when image forming has been made for one document with the focal lens located in a position nearer to the document from the reference position, the moving means moves said focal lens to said reference position before an image forming start switch is operated for the next document.

14. A document density detector apparatus according to claim 9, wherein the moving means moves the focal lens to the reference position after an image forming start switch has been operated.

* * * * *